United States Patent
Salkintzis et al.

(10) Patent No.: US 12,273,250 B2
(45) Date of Patent: *Apr. 8, 2025

(54) MEASURING ROUND TRIP TIME IN A MOBILE COMMUNICATION NETWORK

(71) Applicant: Lenovo (Singapore) Pte. Ltd., New Tech Park (SG)

(72) Inventors: Apostolis Salkintzis, Athens (GR); Dimitrios Karampatsis, Ruislip (GB); Genadi Velev, Darmstadt (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/301,930

(22) Filed: Apr. 17, 2023

(65) Prior Publication Data
US 2023/0254233 A1 Aug. 10, 2023

Related U.S. Application Data

(63) Continuation of application No. 16/959,295, filed as application No. PCT/EP2019/069437 on Jul. 18, 2019, now Pat. No. 11,652,719.

(51) Int. Cl.
*H04W 24/08* (2009.01)
*H04L 43/0864* (2022.01)
*H04L 43/50* (2022.01)

(52) U.S. Cl.
CPC .......... *H04L 43/0864* (2013.01); *H04L 43/50* (2013.01); *H04W 24/08* (2013.01)

(58) Field of Classification Search
CPC .... H04L 43/0864; H04L 43/50; H04W 24/08; H04W 76/16; H04W 88/06
See application file for complete search history.

(56) References Cited

U.S. PATENT DOCUMENTS

| | | | | |
|---|---|---|---|---|
| 2004/0001511 A1* | 1/2004 | Matta | ................... | H04L 41/0896 370/468 |
| 2004/0213160 A1* | 10/2004 | Regan | ..................... | H04L 43/00 370/395.21 |

(Continued)

FOREIGN PATENT DOCUMENTS

WO 2014189723 A1 11/2014

OTHER PUBLICATIONS

Qualcomm Incorporated, "Combined Downlink and Uplink NR Positioning Procedures", 3GPP TSG-RAN WG2 Meeting #104 R2-1817899, Nov. 12-16, 2018, pp. 1-18.

(Continued)

*Primary Examiner* — Meng Vang
*Assistant Examiner* — Hector Reyes
(74) *Attorney, Agent, or Firm* — Kunzler Bean & Adamson

(57) ABSTRACT

Apparatuses, methods, and systems are disclosed that support techniques for measuring round trip time ("RTT"). One method includes transmitting a first request for establishing a data connection between a User Equipment ("UE") and a mobile core network and receiving, from an interworking function ("IWF"), a first message including a first encapsulation packet header that contains an echo request indication, where the first encapsulation packet header complies with a General Routing Encapsulation ("GRE") protocol. The method includes transmitting, to the IWF, a second message including a second encapsulation packet header that contains an echo response indication, where the second encapsulation packet header complies with the GRE protocol.

20 Claims, 11 Drawing Sheets

(56) References Cited

U.S. PATENT DOCUMENTS

| | | | |
|---|---|---|---|
| 2015/0023180 A1 | 1/2015 | Feng | |
| 2015/0351079 A1 | 12/2015 | Himayat et al. | |
| 2016/0197813 A1 | 7/2016 | Jagannath et al. | |
| 2018/0288582 A1* | 10/2018 | Buckley | H04W 12/06 |
| 2019/0215730 A1 | 7/2019 | Qiao et al. | |
| 2019/0215731 A1* | 7/2019 | Qiao | H04W 24/06 |
| 2019/0253917 A1 | 8/2019 | Dao | |
| 2019/0289492 A1 | 9/2019 | Hampel et al. | |
| 2019/0394833 A1 | 12/2019 | Talebi et al. | |
| 2020/0359274 A1* | 11/2020 | Zhu | H04W 40/36 |
| 2021/0153254 A1* | 5/2021 | Zhu | H04L 5/0055 |
| 2021/0168079 A1 | 6/2021 | Yu | |
| 2021/0235311 A1 | 7/2021 | Soma et al. | |
| 2022/0070714 A1* | 3/2022 | Opshaug | H04L 5/0051 |
| 2022/0078692 A1 | 3/2022 | Stojanovski et al. | |
| 2022/0141751 A1 | 5/2022 | Yao et al. | |
| 2022/0150740 A1* | 5/2022 | Yao | H04L 41/5009 |
| 2022/0182861 A1* | 6/2022 | Youn | H04W 28/10 |

OTHER PUBLICATIONS

3GPP, 3rd Generation Partnership Project; Technical Specification Group Services and System Aspects; System Architecture for the 5G System; Stage 2 (Release 16), 3GPP TS 23.501 V16.1.0, Jun. 2019, pp. 1-368.

Nokia, Nokia Shanghai Bell, "Access Network Performance Measurements", SA WG2 Meeting #131 S2-1901538, Feb. 25-Mar. 1, 2019, pp. 1-3.

* cited by examiner

MEASURING ROUND TRIP TIME IN A MOBILE COMMUNICATION NETWORK

CROSS-REFERENCE TO RELATED APPLICATIONS

This application is a continuation of—and claims priority to— U.S. patent application Ser. No. 16/959,295 entitled "MEASURING ROUND TRIP TIME IN A MOBILE COMMUNICATION NETWORK" and filed on Jun. 30, 2020 for Apostolis Salkintzis, Dimitrios Karampatsis and Genadi Velev, which patent application is a national stage entry of—and claims priority to—International Patent Application No. PCT/EP2019/069437 entitled "MEASURING ROUND TRIP TIME IN A MOBILE COMMUNICATION NETWORK" and filed Jul. 18, 2019 for Apostolis Salkintzis, Dimitrios Karampatsis and Genadi Velev, the entire disclosures of each are hereby incorporated by reference.

FIELD

The subject matter disclosed herein relates generally to wireless communications and more particularly relates to measuring round trip time ("RTT").

BACKGROUND

There are many technologies known for measuring the packet delay in Internet Protocol ("IP") communication networks. However, none of them are optimized for Fifth Generation ("5G") New Radio ("NR"), where simplicity and efficiency are primary deciding factors. Even the simplest solution based on "Ping/Pong" is not very efficient, given that a User Equipment ("UE") may consume many radio and battery resources when applying this solution for an extended period of time.

Further, sending frequent Echo Request messages (e.g., once every 5-10 seconds) from the UE to the core network is very inefficient since it consumes many radio, network, and battery resources. Moreover, sending frequent Echo Request messages creates additional traffic, which can increase congestion and can result in much higher latency values.

BRIEF SUMMARY

The present disclosure relates to techniques for measuring RTT. Said techniques may be implemented by apparatus, systems, methods, or computer program products.

One method of a communication device (e.g., a UE) includes transmitting a first request for establishing a data connection between the communication device and a mobile core network and receiving, from an interworking function ("IWF"), a first message associated with the data connection, where the first message comprising a first encapsulation packet header comprising an echo request indication, and where the first encapsulation packet header complies with a General Routing Encapsulation ("GRE") protocol. The method includes transmitting, to the IWF, a second message in response to the first message, the second message comprising a second encapsulation packet header comprising an echo response indication, wherein the second encapsulation packet header complies with the GRE protocol.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
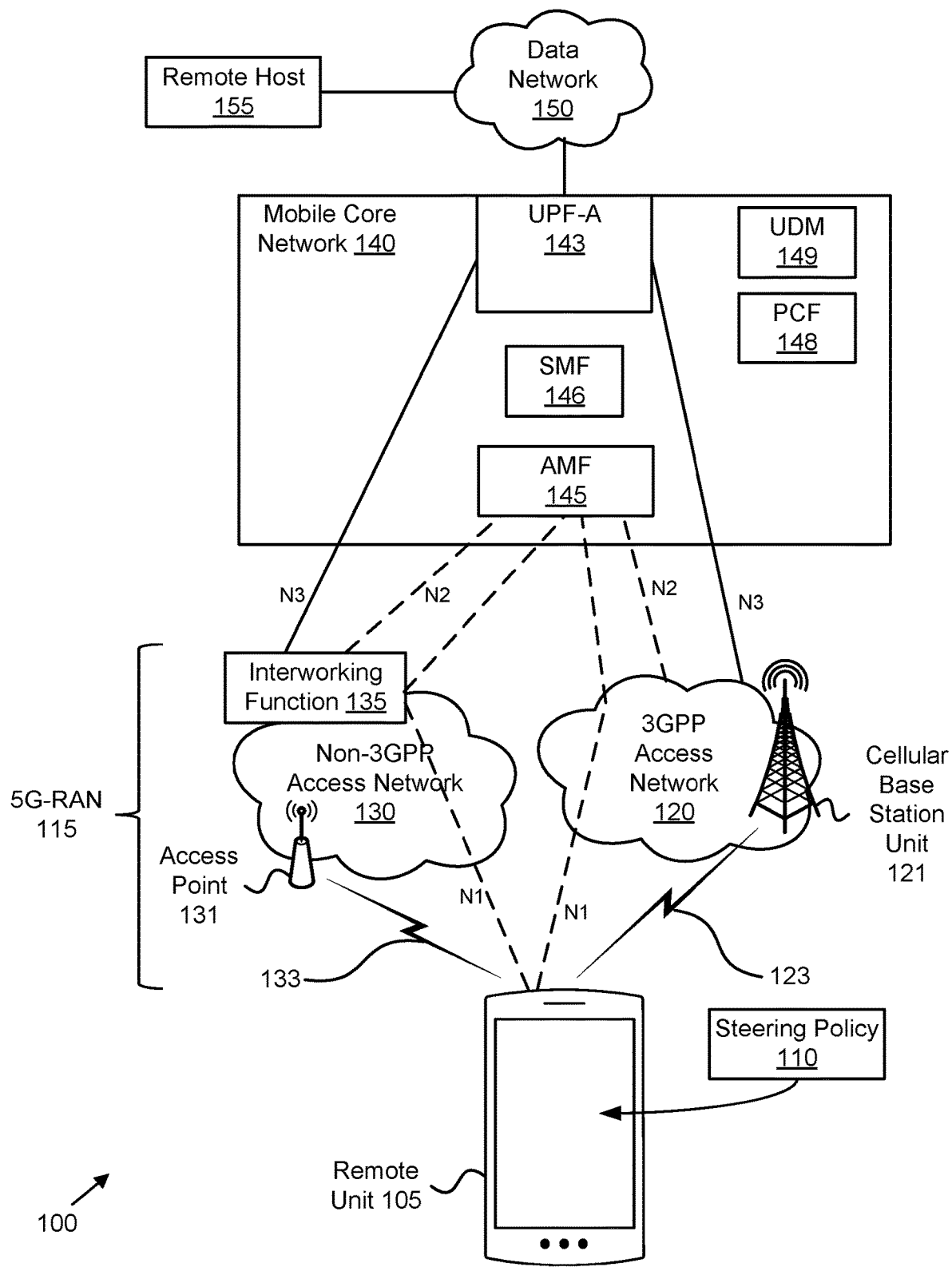
FIG. 1 illustrates an example of a wireless communication system that supports techniques for measuring RTT in accordance with aspects of the present disclosure.

Methods, apparatuses, and systems are disclosed for measuring RTT. A UE may be required to monitor latency of multiple access networks in order to select a "best" access network. In a first use case, a UE capable of supporting Access Traffic Steering, Switching, Splitting ("ATSSS"), can simultaneously communicate over a Third Generation Partnership Project ("3GPP") access network (e.g., a Next Generation Radio Access Network ("NG-RAN")) and over a non-3GPP access network (e.g., a Wireless Local Area Network ("WLAN")), where the traffic exchanged between the UE and a Remote Host can either be distributed over both accesses, or can be sent on the "best" access only, e.g., on the access characterized by the least latency, or the least RTT. In the uplink ("UL") direction, the UE decides how to distribute the traffic across the two accesses based on policy rules (e.g., ATSSS rules) provided by the network. Similarly, in the downlink ("DL") direction, a User Plane Function ("UPF") at the edge of the 5G Core network ("5GC") decides how to distribute the traffic across to the two accesses based on corresponding policy rules.

In many scenarios, where communication latency is important, the policy rules may indicate that specific traffic should be routed according to a latency-dependent condition. For example, the policy rules in the UE may indicate "Route traffic to Remote Host over 3GPP access, if Latency over 3GPP access<20 ms". As another example, the policy rules in the UE may indicate "Route IMS voice traffic to the access with the smallest Latency".

To enforce the above policy rules, the UE is required to measure the latency (e.g., RTT) over the 3GPP access and the latency/RTT over the non-3GPP access. Similarly, the UPF is required to measure the latency (e.g., RTT) over the 3GPP access and the latency/RTT over the non-3GPP access, in order to decide how to route the DL traffic in compliance with the policy rules.

The 3GPP specifications in Rel-16 indicate that a Performance Measurement Functionality ("PMF") shall be supported in the UPF, which assists the UE (and the UPF itself) in taking RTT measurements over the two accesses. In particular, the Rel-16 3GPP specifications specify that RTT measurements can be taken by exchanging Echo Request/Echo Response messages between the UE and the PMF in the UPF. This way the UE can calculate a RTT over each access, which is tightly associated with the latency of each access.

However, sending frequent Echo Request messages (e.g., once every 5-10 sec) from the UE to PMF is very inefficient since it consumes a lot of radio, network, and battery resources. Furthermore, sending frequent Echo Request messages creates additional traffic, which can increase congestion and can result in much higher latency values.

One purpose of this disclosure is to specify an alternative technique for measuring the RTT in the UE and in the UPF, which does not require the exchange of dedicated Echo Request/Echo Response messages and thus it improves the efficiency of the measurement process.

A second use case is when the network needs to monitor the RTT between the UE and Trusted Non-3GPP Gateway Function ("TNGF") and/or Non-3GPP Interworking Function ("N3IWF") and take actions when the RTT exceeds specific thresholds. For example, in order to support an application that requires low latency, the network may want to monitor the RTT when the traffic of this application is transported over non-3GPP access, and possibly to transfer this traffic over 3GPP access, when the RTT over non-3GPP access cannot remain below, e.g., 30 ms.

In this second case (as opposed to the first use case), there is no need for the UE and/or the UPF to measure the RTT. It is only needed by a control-plane entity in 5GC (e.g., by SMF) to receive a notification from TNGF/N3IWF when the RTT exceeds a certain threshold. Accordingly, another purpose of this disclosure is to specify a technique whereby the SMF can receive the RTT value measured by TNGF/N3IWF or a notification when this RTT value exceeds certain thresholds.

In general, there are many technologies known for measuring the packet delay in IP communication networks. However, none of them are suitably efficient for crowded air interfaces, where simplicity and efficiency are the primary deciding factors. Even the simplest solution based on Echo Request/Echo Response messages is not very efficient, given that UEs may consume many radio and battery resources when they apply this solution for an extended period of time.

Also, many known technologies for packet delay measurement are not applicable in 5G because they require some sort of proxy functionality in the 5G core network, which is not available and is unlikely to be introduced. For example, the UPF in 5GC could apply a SOCKS proxy (e.g., as defined by the Internet Engineering Task Force ("IETF")) that terminates all User Datagram Protocol ("UDP") and Transmission Control Protocol ("TCP") flows of the UE and then creates corresponding outbound flows over the N6 interface. However, the proxy operation introduces a lot of overhead and can have a severe impact on the packet throughput and on the battery consumption of UEs.

Note that a proxy functionality is defined in 5GC but only to enable Multi-Path TCP ("MPTCP") operation, nothing else. Because of this, the disclosed measurement method in this disclosure is not required when MPTCP is used. However, the disclosed measurement method is needed when the MPTCP protocol is not applied for traffic steering operations.

FIG. 1 illustrates an example of a wireless communication system 100 for measuring RTT, in accordance with aspects of the present disclosure. In one embodiment, the wireless communication system 100 includes at least one remote unit 105, a Fifth Generation Radio Access Network ("5G-RAN") 115, and a mobile core network 140. The 5G-RAN 115 and the mobile core network form a mobile communication network. The 5G-RAN 115 may be composed of a 3GPP access network 120 containing at least one cellular base station unit 121 and/or a non-3GPP access network 130 containing at least one access point 131. The remote unit communicates with the 3GPP access network 120 using 3GPP communication links 123 and communicates with the non-3GPP access network 130 using non-3GPP communication links 133. Even though a specific number of remote units 105, 3GPP access networks 120, cellular base station units 121, 3GPP communication links 123, non-3GPP access networks 130, access points 131, non-3GPP communication links 133, and mobile core networks 140 are depicted in FIG. 1, one of skill in the art will recognize that any number of remote units 105, 3GPP access networks 120, cellular base station units 121, 3GPP communication links 123, non-3GPP access networks 130, access points 131, non-3GPP communication links 133, and mobile core networks 140 may be included in the wireless communication system 100.

In one implementation, the wireless communication system 100 is compliant with the 5G system specified in the 3GPP specifications. More generally, however, the wireless communication system 100 may implement some other open or proprietary communication network, for example, Long-Term Evolution ("LTE") or Worldwide Interoperability for Microwave Access ("WiMAX"), among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the cellular base station units 121 in the 3GPP access network 120 via UL and DL communication signals. Furthermore, the UL and DL communication signals may be carried over the 3GPP communication links 123. Similarly, the remote units 105 may communicate with one or more access points 131 in the non-3GPP access network(s) 130 via UL and DL communication signals carried over the non-3GPP communication links 133. Here, the access networks 120 and 130 are intermediate networks that provide the remote units 105 with access to the mobile core network 140.

In some embodiments, the remote units 105 communicate with a remote host 155 via a network connection with the mobile core network 140. For example, an application in a remote unit 105 (e.g., web browser, media client, telephone/VoIP application) may trigger the remote unit 105 to establish a Protocol Data Unit ("PDU") session (or other data connection) with the mobile core network 140 using the 5G-RAN 115 (e.g., a 3GPP access network 120 and/or a non-3GPP access network 130). The mobile core network 140 then relays traffic between the remote unit 105 and the data network 150 (e.g., remote host 155) using the PDU session. Note that the remote unit 105 may establish one or more PDU sessions (or other data connections) with the mobile core network 140. As such, the remote unit 105 may have at least one PDU session for communicating with the data network 150. The remote unit 105 may establish additional PDU sessions for communicating with other data network and/or other remote hosts.

The cellular base station units 121 may be distributed over a geographic region. In certain embodiments, a cellular base station unit 121 may also be referred to as an access terminal, a base, a base unit, a base station, a Node-B, an eNB, a gNB, a Home Node-B, a relay node, a device, or by any other terminology used in the art. The cellular base station units 121 are generally part of a radio access network ("RAN"), such as the 3GPP access network 120, that may include one or more controllers communicably coupled to one or more corresponding cellular base station units 121. These and other RAN elements are not illustrated but are well known generally by those having ordinary skill in the art. The cellular base station units 121 connect to the mobile core network 140 via the 3GPP access network 120.

The cellular base station units 121 may serve a number of remote units 105 within a serving area, for example, a cell or a cell sector, via a 3GPP communication link 123. The cellular base station units 121 may communicate directly with one or more of the remote units 105 via communication signals. Generally, the cellular base station units 121 transmit DL communication signals to serve the remote units 105 in the time, frequency, and/or spatial domain. Furthermore, the DL communication signals may be carried over the 3GPP communication links 123. The 3GPP communication links 123 may be any suitable carrier in licensed or unlicensed radio spectrum. The 3GPP communication links 123 facilitate communication between one or more of the remote units 105 and/or one or more of the cellular base station units 121.

The non-3GPP access networks 130 may be distributed over a geographic region. Each non-3GPP access network 130 may serve a number of remote units 105 with a serving area. Typically, a serving area of the non-3GPP access network 130 is smaller than the serving area of a cellular base station unit 121. An access point 131 in a non-3GPP access network 130 may communicate directly with one or more remote units 105 by receiving UL communication signals and transmitting DL communication signals to serve the remote units 105 in the time, frequency, and/or spatial domain. Both DL and UL communication signals are carried over the non-3GPP communication links 133. The 3GPP communication links 123 and non-3GPP communication links 133 may employ different frequencies and/or different communication protocols. In various embodiments, an access point 131 may communicate using unlicensed radio spectrum. The mobile core network 140 may provide services to a remote unit 105 via the non-3GPP access networks 130, as described in greater detail herein.

In some embodiments, a non-3GPP access network 130 connects to the mobile core network 140 via an IWF 135. The IWF 135 provides interworking between the remote unit 105 and the mobile core network 140. In some embodiments, the IWF 135 is a N3IWF and, in other embodiments, it is a TNGF. The N3IWF supports the connection of "untrusted" non-3GPP access networks to the mobile core network (e.g., 5GC), whereas the TNGF supports the connection of "trusted" non-3GPP access networks to the mobile core network. The IWF 135 supports connectivity to the mobile core network 140 via the "N2" and "N3" interfaces, and it relays "N1" signaling between the remote unit 105 and the AMF 145. As depicted, both the 3GPP access network 120 and the IWF 135 communicate with the AMF 145 using a "N2" interface. The IWF 135 also communicates with the UPF 143 using a "N3" interface.

The non-3GPP access network 130 may support three different types of IWFs 135. A first type ("Type 1") supports connectivity to one or more 5GC networks for UEs which do not support the NAS protocol. A second type ("Type 2") supports connectivity to one or more 5GC networks for UEs which do support the NAS protocol. A third type ("Type 3") supports connectivity to one or more EPC networks using the existing S2a procedures (see 3GPP TS 23.402). Note that a non-3GPP access network 130 may support one, two, or all three types of IWFs.

In certain embodiments, a non-3GPP access network 130 may be controlled by an operator of the mobile core network 140 and may have direct access to the mobile core network 140. Such a non-3GPP AN deployment is referred to as a "trusted non-3GPP access network." A non-3GPP access network 130 is considered as "trusted" when it is operated by the 3GPP operator, or a trusted partner, and supports certain security features, such as strong air-interface encryption. In contrast, a non-3GPP AN deployment that is not controlled by an operator (or trusted partner) of the mobile core network 140, does not have direct access to the mobile core network 140, or does not support the certain security features is referred to as a "non-trusted" non-3GPP access network.

In one embodiment, the mobile core network 140 is a 5GC or an evolved packet core ("EPC"), which may be coupled to a data network (e.g., the data network 150, such as the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes multiple user plane functions ("UPFs"). Here, the mobile core network 140 includes at least a UPF 143 that serves the 3GPP access network 120 and the non-3GPP access network 130. Note that in certain embodiments, the mobile core network may contain one or more intermediate UPFs, for example a first intermediate UPF that serves the non-3GPP access network 130 and the second intermediate UPF that serves the 3GPP access network 120. In such embodiments, the UPF 143 would be an anchor UPF receiving UP traffic of both intermediate UPFs.

The mobile core network 140 also includes multiple control plane functions including, but not limited to, an Access and Mobility Management Function ("AMF") 145 that serves both the 3GPP access network 120 and the non-3GPP access network 130, a Session Management Function ("SMF") 146, a Policy Control Function ("PCF") 148, and a Unified Data Management function ("UDM") 149. In certain embodiments, the mobile core network 140 may also include an Authentication Server Function ("AUSF"), a Network Repository Function ("NRF") (used by the various NFs to discover and communicate with each other over APIs), or other NFs defined for the 5GC.

In various embodiments, the mobile core network 140 may include a PMF (not shown in FIG. 1) to assist the remote unit 105 and/or the anchor UPF 143 in taking performance measurements over the two accesses, including latency measurements. In one embodiment, the PMF may be co-located with the anchor UPF 143.

Although specific numbers and types of network functions are depicted in FIG. 1, one of skill in the art will recognize that any number and type of network functions may be included in the mobile core network 140. Moreover, where the mobile core network 140 is an EPC, the depicted network functions may be replaced with appropriate EPC entities, such as an Mobility Management Entity ("MIME"), a Serving Gateway ("SGW"), a Packet Gateway ("PGW"), a Home Subscriber Server ("HSS"), and the like.

As depicted, a remote unit 105 (e.g., a UE) may connect to the mobile core network (e.g., to a 5G mobile communication network) via two types of accesses: (1) via 3GPP access network 120 and (2) via a non-3GPP access network 130. The first type of access (e.g., 3GPP access network 120) uses a 3GPP-defined type of wireless communication (e.g., NG-RAN) and the second type of access (e.g., non-3GPP access network 130) uses a non-3GPP-defined type of wireless communication (e.g., WLAN). The 5G-RAN 115 refers to any type of 5G access network that can provide access to the mobile core network 140, including the 3GPP access network 120 and the non-3GPP access network 130.

In various embodiments, the mobile core network 140 supports different types of mobile data connections and different types of network slices, wherein each mobile data connection utilizes a specific network slice. The different network slices are not shown in FIG. 1 for ease of illustration, but their support is assumed.

In many scenarios, where communication latency is important, the policy rules (e.g., of steering policy 110) may indicate that specific traffic should be routed according to a latency-dependent condition. In one example, the traffic steering rules in the remote unit 105 may indicate: "Route traffic to Remote Host over 3GPP access, if Latency over 3GPP access<20 ms". In another example, or the traffic steering rules in the remote unit 105 may indicate: "Route IMS voice traffic to the access with the smallest Latency". Note that "IMS" refers to the IP Multimedia Subsystem.

To enforce such policy rules, the remote unit 105 measures the latency over 3GPP access and the latency over non-3GPP access. In certain embodiments, the UPF 143 may measure the latency over 3GPP access and the latency over non-3GPP access, in order to decide how to route the DL traffic in compliance with the policy rules. In other embodiments, one of the UE 205 and the UPF 143 may report to the other the latency over 3GPP access and the latency over non-3GPP access, with the assumption of strong correlation between UL latencies and DL latencies.

In certain embodiments, the remote unit 105 transmit a request to establish a data connection (e.g., a PDU session) with the mobile core network 140 via the IWF 135 and may indicate in the request that it supports RTT measurements using encapsulation header (e.g., GRE headers). Thereafter, the remote unit 105 may occasionally receive a message from the IWF 135 having an encapsulation header that includes an echo request indication. In response to the echo request, the remote unit 105 may immediately send back an echo response (e.g., Echo Acknowledgment ("ACK")) message to the IWF 135, wherein the IWF 135 measures RTT using the elapsed time between sending the message with the echo request and receiving the echo response. Additional details for measuring RTT are discussed below.

Figure 2A:
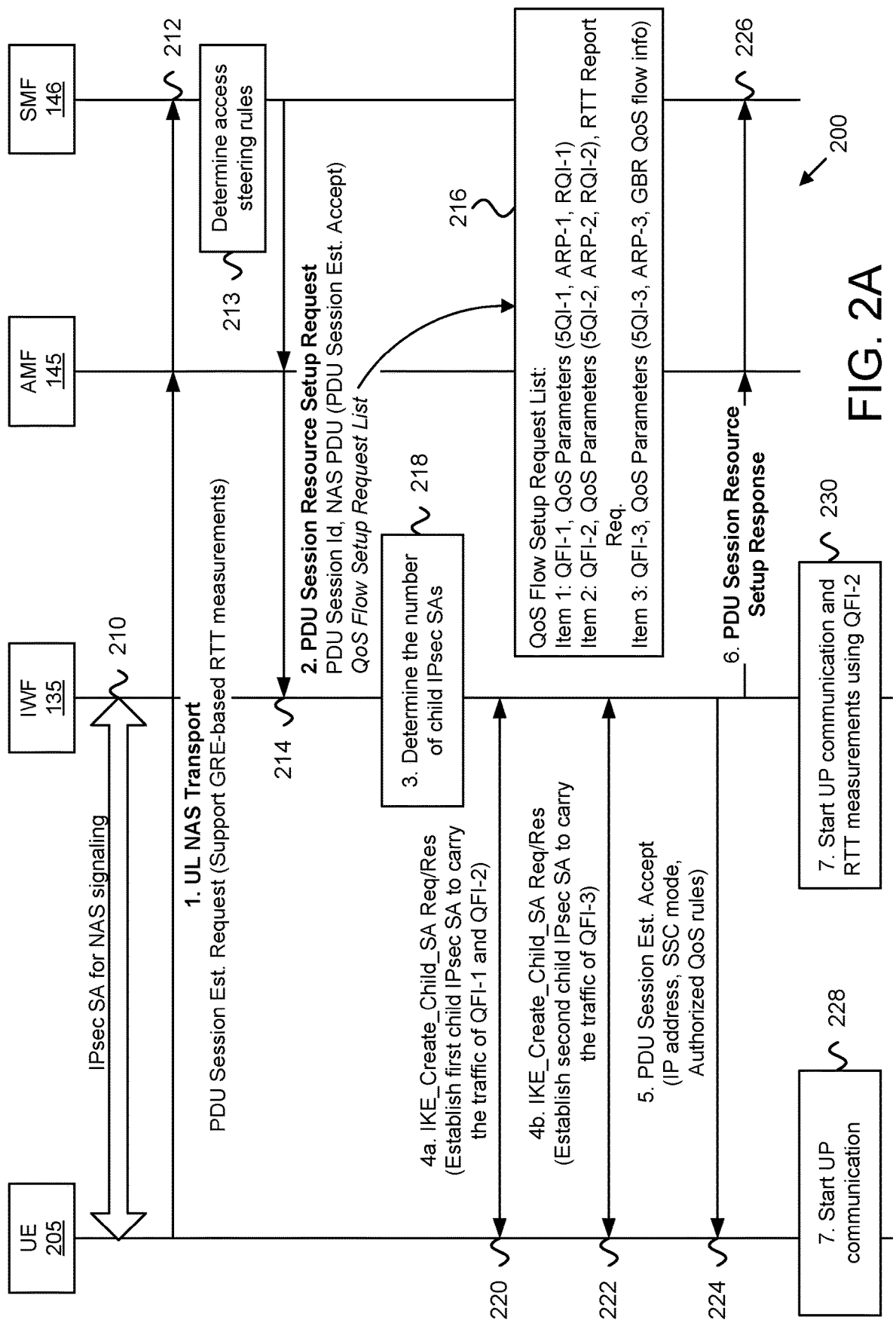
FIG. 2A illustrates an example of a procedure that supports techniques for measuring RTT in accordance with aspects of the present disclosure.
Figure 2B:
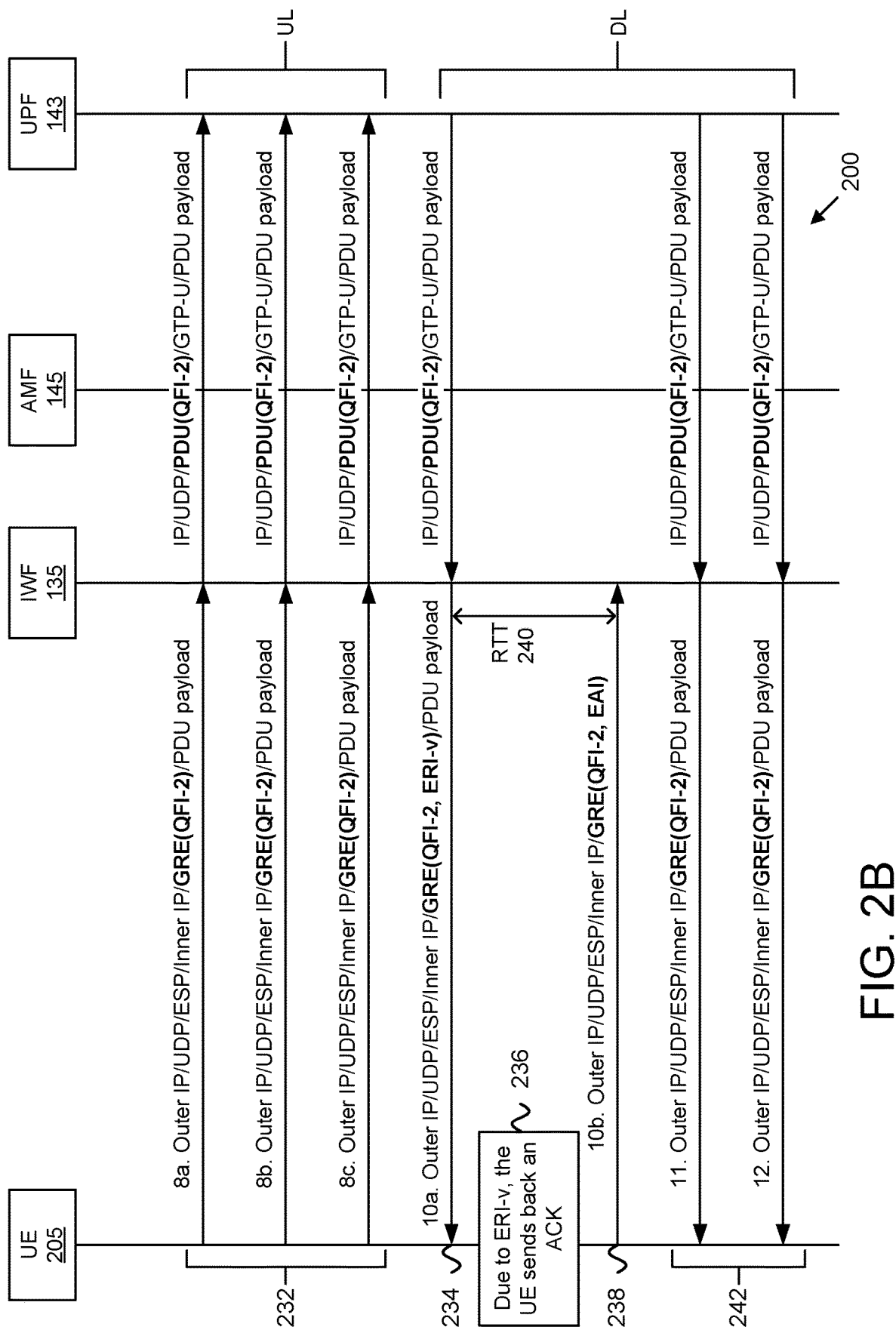
FIG. 2B illustrates a continuation of the procedure depicted in FIG. 2A.
Figure 2C:
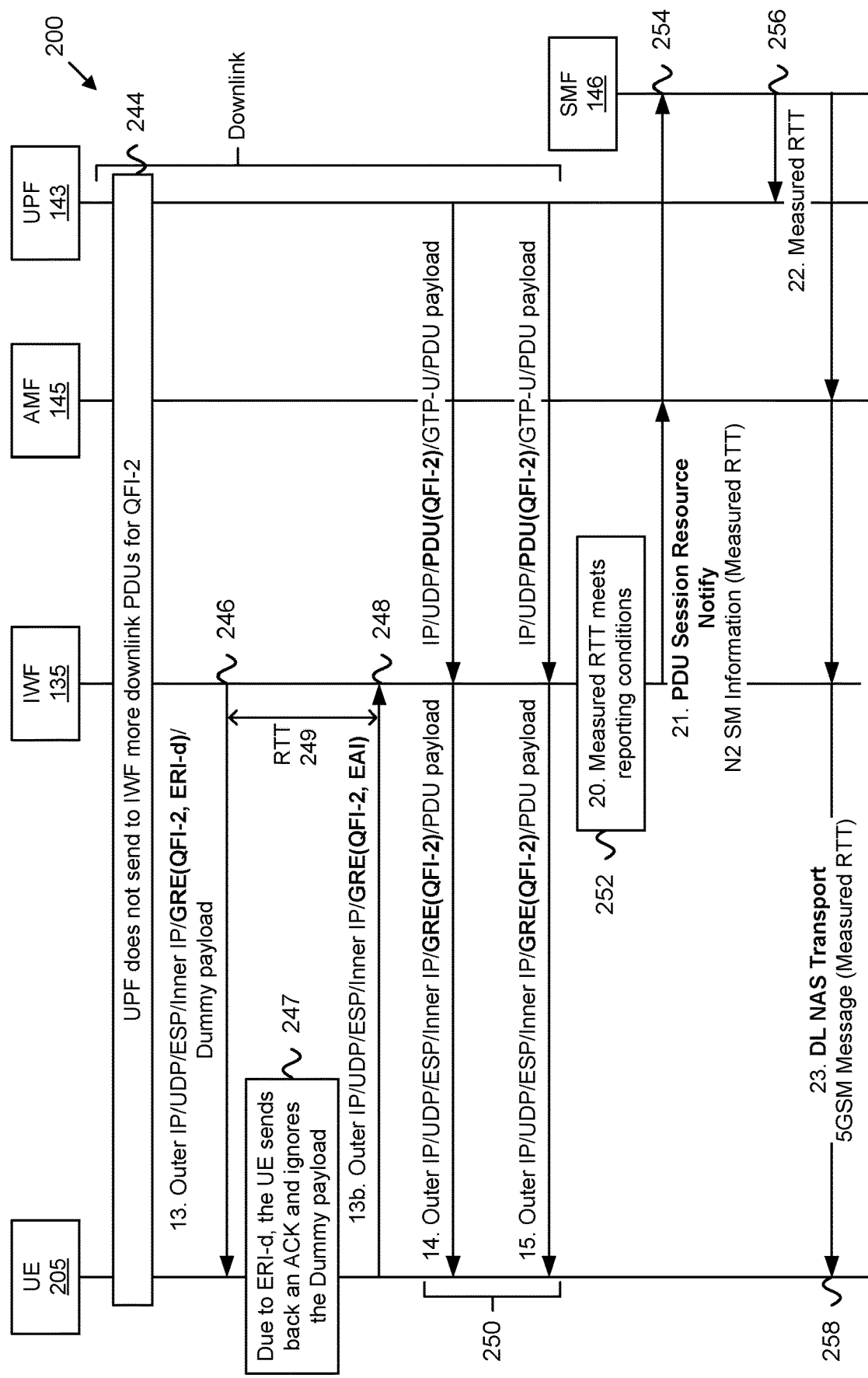
FIG. 2C illustrates a continuation of the procedure depicted in FIGS. 2A-B.

FIGS. 2A-2C illustrate a first procedure 200 for measuring RTT of an access network, in accordance with aspects of the present disclosure. In the first procedure 200, the UE 205 does not take its own RTT measurements but can receive from the SMF the RTT measured by the network. Note that the first procedure 200 can support the first use case and the second use case described above. The first procedure 200 involves a UE 205, the IWF 135, the UPF 143, the AMF 145, and the SMF 146. Recall that the UPF 143 can send user traffic over either the 3GPP access or the non-3GPP access.

At FIG. 2A, the first procedure 200 begins with the UE 205 establishing one or more IP security ("IPsec") Security Associations ("SAs") for Non-Access Stratum ("NAS") signaling with the IWF 135 (see operation 210). In some embodiments, the IWF 135 is an TNGF. In other embodiments, the IWF 135 is a N3IWF.

At step 1, the UE 205 requests a PDU Session, e.g., by sending a PDU Session Establishment Request message (see operation 212). In this message, the UE 205 includes an indication (e.g., the new indication "support GRE-based RTT measurements") that shows it can support RTT measurements over non-3GPP access by using the techniques specified herein, which utilizes the GRE protocol.

In one example, the UE 205 requests a Multi-Access PDU ("MA PDU") Session, i.e., a PDU Session that can support data communication over both 3GPP access and non-3GPP access. In this case, the UPF 143 in the network and the UE 205 may need to measure the RTT over each access, in order to determine how to route the DL and the UL traffic respectively of the MA PDU Session. The RTT over each access may be needed if, for example, some traffic should be routed based on a "Smallest Delay" steering mode. In this case, the RTT should be measured over each access so that the access with the smallest delay can be determined. This situation is one example of the first use case, discussed above.

A PCF in the 5GC (not shown in FIG. 2A-2C) creates Policy and Charging Control ("PCC") rules for the MA PDU Session, which are sent to SMF 146 and indicate (1) what Quality-of-Service ("QoS") should be applied for selected data flows sent over the MA PDU Session, (2) what steering modes should be applied for selected data flows sent over the MA PDU Session, etc.

One example of PCC rules are as follows:

A first PCC rule may indicate that (1) the traffic of a first application (denoted "App-1") is to be transported by using a first 5G QoS Indicator ("5QI") (denoted "5QI-1") and (2) the traffic of App-1 is to be steered to a 3GPP access, if available, and otherwise, steered to a non-3GPP access.

A second PCC rule may indicate that (1) the traffic of a second application (denoted "App-2") is to be transported by using a second 5QI (denoted "5QI-2") and (2) the traffic of App-2 is to be steered to the access with the "smallest delay".

A third PCC rule may indicate that (1) the traffic of a third application (denoted "App-3") should be transported by using a third 5QI (denoted "5QI-3") having 200 Kbps guaranteed bandwidth in the UL direction and 500 Kbps guaranteed bandwidth in the DL direction, and (2) the traffic of App-3 should be steered to a non-3GPP access, if available, and otherwise, steered to a 3GPP access.

Based on the received PCC rules for the MA PDU Session, the SMF 146 determines (1) access steering rules for the UE 205 (e.g., ATSSS rules), and (2) access steering rules for the UPF 143 (see operation 213). In addition, the SMF 146 determines what QoS flows should be established for the MA PDU Session and creates the associated QoS rules for the UE 205 and the associated QoS Enforcement Rules ("QERs") for the UPF 143.

Based on the second PCC rule considered above, the SMF 146 determines that (1) RTT measurements need to be obtained by the UE 205 and UPF 143 in order to determine which access has the "smallest delay" and (2) the RTT measurements should be obtained by using 5QI-2, i.e., the same 5QI applied for App-2, which should be steered with the "smallest delay" steering mode. The steps below specify how the UE 205 and UPF 143 obtain necessary RTT measurements.

At step 2, the IWF 135 receives a PDU Session Resource Setup Request message (see operation 214), which includes a PDU Session Establishment Accept message and a QoS Flow Setup Request List 216, which includes a list of three different QoS flows, each one corresponding to one of the three PCC rules considered above. A respective QoS flow (i.e., identified by a QoS Flow Identifier ("QFI")) may be associated with a set of associated QoS parameters, including a 5QI, an Allocation/Retention Policy ("ARP"), and a Reflective QoS Indicator ("RQI").

Note that for the second QoS flow, the SMF 146 includes, not only the associated QoS parameters {5QI-2, ARP-2, RQI-2}, but also a new parameter called RFI Report Request, which indicates to the IWF 135 that it should measure the RTT over this QoS flow and it should report the measured RTT to the SMF 146 based on some reporting conditions. For example, this new parameter may indicate to the IWF 135 to report the measured RTT whenever it changes by +/−10% over the previously reported RTT value. In another case, associated with the second use case (see above), the reporting conditions may indicate to the IWF 135 to report the RTT, or to send a notification to the SMF 146, only when the measured RTT value exceeds a certain threshold. In some other cases, the RTT Report Request may not include reporting conditions, which may indicate to the IWF 135 that the measured RTT should be reported whenever a new value is available. In yet some other cases, the RTT Report Request may include measurement parameters, for example, to indicate how often the RTT should be measured.

Note that the SMF 146 does not send the RTT Report Request parameter to the IWF 135 unless the UE 205 indicates it can "support GRE-based RTT measurements" (in step 1). If the UE 205 cannot "support GRE-based RTT measurements", then RTT measurements can be taken as specified in Rel-16 of the 3GPP specifications, i.e., by exchanging PMF-Echo Request/Response messages between the UE 205 and the UPF 143.

At step 3, the IWF 135, as normally, determines the number of child IPsec SAs to be established, which one carrying one or more of the three QoS flows decided by the PCF for the MA PDU Session (see operation 218). In the example depicted in FIG. 2A, the IWF 135 decides to establish two child IPsec SAs: the first child IPsec SA carrying the traffic of the first and second QoS flows (denoted "QFI-1" and "QFI-2," respectively), and the second child IPsec SA carrying the traffic of a third QoS flow (denoted "QFI-3").

At step 4, the IWF 135 sends messages to the UE 205 to establish the determined number of child IPsec SAs (see operation 220 and operation 222). At step 5, the IWF 135 forwards to the UE 205 the PDU Session Establishment Accept message received in step 2 (see operation 224).

At step 6, the IWF 135 responds to the request received in the step 2 with a PDU Session Resource Setup Response message, indicating that the radio access resources for the PDU Session have been successfully established over non-3GPP access (see operation 226).

At step 7, the UE 205 and the UPF 143 may start user-plane ("UP") communication over the non-3GPP access of the PDU Session (see operation 228 and operation 230). In addition to UP communication, the IWF 135 may start RTT measurements over the second QoS flow (i.e., QFI-2), as instructed in step 2 with the reception of the RTT Report Request parameter for this QoS flow.

Continuing at FIG. 2B, at step 8, in the UL direction, the UE 205 sends UP traffic (i.e., a series of PDU payloads) to the IWF 135, encapsulated with GRE (see operation 232). The GRE header includes the QoS Flow Identifier ("QFI") associated with the encapsulated PDU payload. FIG. 2B shows only PDU payloads associated with QFI-2 for ease of illustration, however, PDU payloads associated with QFI-1 and QFI-3 will also be sent.

Note that the UE does not include any new indicators in the GRE header at this time because the UE is not instructed to perform RTT measurements in the first procedure 200. The IWF 135 forwards every PDU payload received from the UE 205 to the UPF 143 over the N3 interface, which utilizes General Packet Radio Service ("GPRS") Tunneling Protocol for User data ("GTP-U") encapsulation.

In the DL direction, the UPF 143 sends UP traffic (i.e., a series of PDU payloads) to the IWF 135 over the N3 interface. In turn, the IWF 135 encapsulates these PDU payloads with GRE, and forwards them to the UE 205. As normally, the GRE header includes the QFI associated with the encapsulated PDU payload.

However, when the IWF 135 wants to measure the RTT at step 10, the IWF 135 includes a new indicator in the GRE header, referred to as an Echo Request Indicator ("ERI") (see operation 234). When the UE 205 receives a GRE packet with the ERI in the header, it immediately responds with a GRE packet that contains an Echo ACK Indicator ("EAI") (see operation 236 and operation 238). This GRE packet does not contain a PDU payload; it is only an acknowledgment that aids the IWF 135 measure the current RTT between the UE 205 and IWF 135. The IWF 135 measures the RTT 240 by computing the time difference between the transmitted GRE packet with the ERI and the received GRE packet with the EAI.

At steps 11-12, the IWF 135 does not include the ERI in all PDU payloads forwarded to the UE 205 (see operation 242). The ERI is only included when the IWF 135 wants to take another RTT measurement and update the average RTT value. In one embodiment, the (average) RTT is the "cumulated moving average" of the round trip time of the first access. Here, after EAI(1), the RTT=rtt. After EAI(2), the RTT=(RTT+rtt)/2. After EAI(3) the RTT=(2×RTT+rtt)/3. After EAI(4) the RTT=(3×RTT+rtt)/4. In general, after EAI(n+1), $RTT_{NEW}=(n \times RTT_{OLD}+rtt)/(n+1)$. In other embodiments, the IWF 135 may use other types of averaging to calculate the (average) RTT of the RAN, such as a "weighted moving average" where recent RTT values have a bigger weight than older RTT values.

Continuing at FIG. 2C, step 13 shows the case where the IWF 135 does not receive DL traffic from UPF 143 for some time (see operation 244). In order to take another RTT measurement when there is no DL traffic to deliver to the UE 205, the IWF 135 may send a "Dummy" payload to the UE 205 and include the ERI indicator in the GRE header (see operation 246). However, in this case, the IWF 135 needs also to instruct the UE 205 to discard the dummy payload. For this purpose, the IWF 135 includes a different ERI indicator, referred to as 'ERI-d,' which has a different value from the ERI indicator, called 'ERI-v,' that is included in step 10. The ERI-v indicator is included when the PDU payload is valid and should be consumed by the UE 205, whereas the ERI-d indicator is included when the PDU payload is dummy and should be discarded (ignored) by the UE 205 (see operation 247).

The UE 205 transmits a GRE packet with the EAI indicator when it receives a GRE packet including either the ERI-v or the ERI-d indicator (see operation 248) allowing the IWF 135 to measure the RTT 249. Recall that this UE behavior is only possible when the UE 205 indicates in step 1 that is capable to "support GRE-based RTT measurements". Otherwise, the UE 205 would ignore the ERI-v and ERI-d indicators in the GRE headers.

At steps 14-15, more PDU payloads are forwarded by the IWF 135 to the UE 205 without an ERI indicator (see messages 250). At step 20, the IWF 135 decides to report to SMF 146 the measured (and averaged) RTT (see block 252). Here the decision is made according to the reporting conditions in the received RTT Report Request parameter (see step 2). At step 21, the IWF 135 sends to SMF 146, via the AMF 145, the measured (and averaged) RTT, e.g. within a PDU Session Resource Notify message (see messaging 254). Alternatively, the IWF 135 may send the measured RTT to UPF 143. The UPF 143 may then add to the measured RTT received from IWF 135 (i.e., the RAN-RTT) a second RTT measured over the N3 interface (i.e., between the UPF 143 and the IWF 135), and forward the sum of these RTT values to SMF 146. This way, the SMF 146 becomes aware of the total RTT between the UE 205 and the UPF 143. The RTT over the N3 interface can be measured with procedures not specified in this document, e.g., by using the QoS Monitoring procedures defined in 3GPP TS 23.501.

The following two steps are required only to support the first use case (e.g., supporting ATSSS), where both the UE 205 and the UPF 143 are to be aware of the RTT over non-3GPP access. To support the second use case (e.g., RTT monitoring), it is sufficient for the IWF 135 to send to SMF 146 (in step 21) the measured RTT or a notification when the RTT exceeds predefined thresholds. Alternatively, it may be sufficient for the IWF 135 to send to UPF 143 the measured RTT and then for the UPF 143 to send to SMF 146 the total RTT between the UE 205 and the UPF 143.

At step 22, the SMF 146 forwards the measured RTT received from the IWF 135 to the UPF 143 (see messaging 256). as discussed above, the UPF 143 may add the measured RAN-RTT received from SMF 146 to the N3-RTT (measured over the N3 interface) to obtain the total RTT between the UE 105 and the UPF 143. The RTT over the N3 interface is measured with means not discussed in this document, e.g., by exchanging GTP-U Echo Request/Echo Response messages using the second QoS flow identified by QFI-2.

Finally, at step 23 the SMF 146 forwards also the measured RTT received from the IWF 135 to the UE 205, again after adding the RTT over the N3 interface (see messaging 258). After this step, both the UE 205 and the UPF 143 have the same value of RTT that characterizes the entire path between the UE 205 and the UPF 143 over non-3GPP access. The UE 205 and UPF 143 can use this value of RTT for taking their ATSSS decisions and route the UL and DL traffic of App-2, respectively, to the access with the smallest delay (e.g., the smallest RTT), as required by the second PCC rule considered in step 2.

In various embodiments, the ERI-v, ERI-d and EAI indicators discussed above may be contained within the Key field of the GRE header and encoded by using two bits as shown in Table 1.

TABLE 1

| Bit 2 | Bit 1 | |
|---|---|---|
| 0 | 0 | Indicates no ERI and no EAI are included |
| 0 | 1 | Indicates ERI-v (i.e., echo request with valid payload) |
| 1 | 0 | Indicates ERI-d (i.e., echo request with a dummy payload) |
| 1 | 1 | Indicates EAI (i.e., an echo ACK, no payload) |

While the above example uses two bits in the GRE header to encode an ERI (e.g., ERI-v or ERI-d), in other embodiments the IWF 135 and UE 205 may use different amounts of bits to communicate the ERI. For example, a single bit in the GRE header may be used to indicate an echo request. Still further, the ERI and/or EAI are not restricted to GRE headers, and in other embodiments there may be communicated in different encapsulation headers.

Figure 3A:
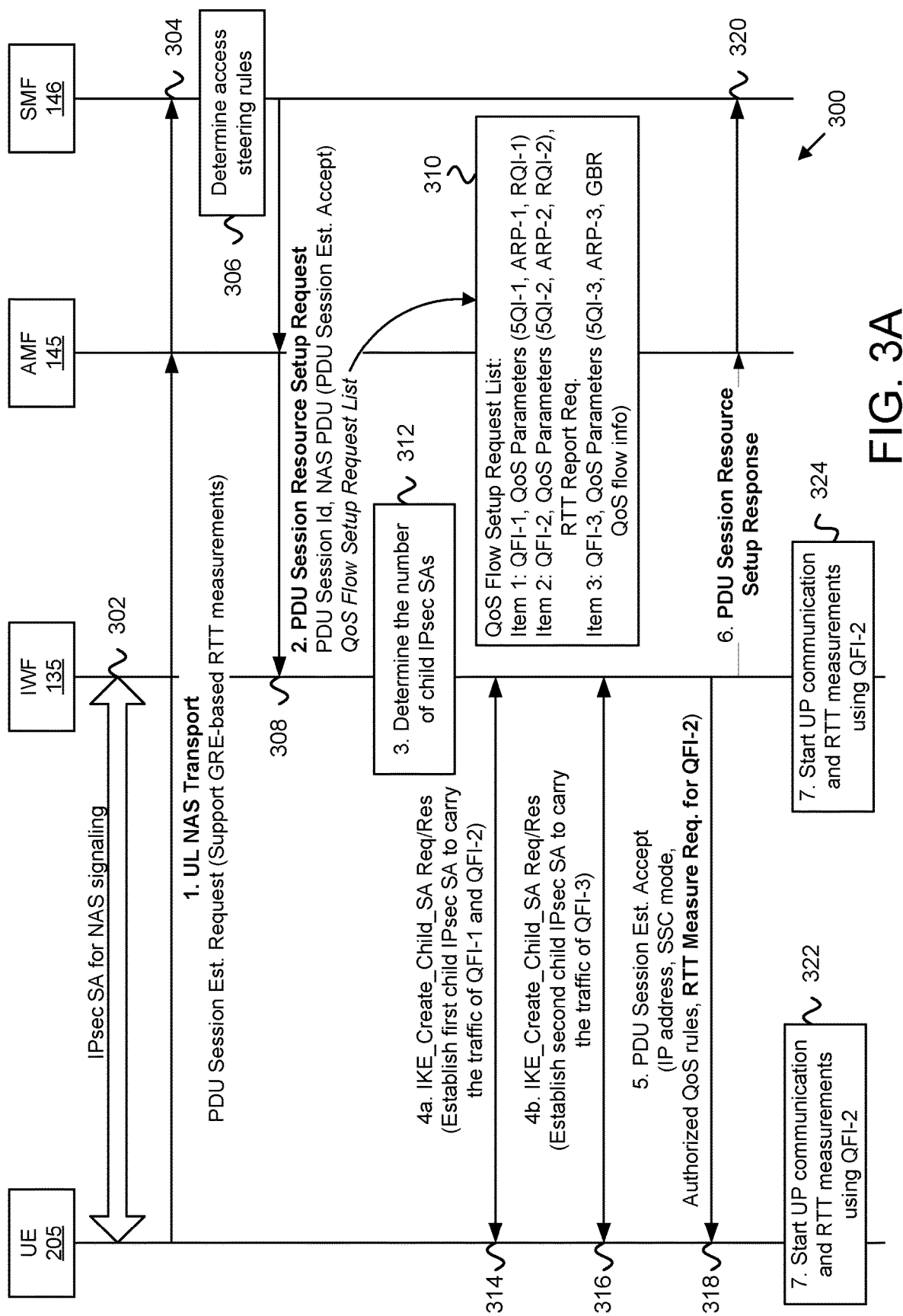
FIG. 3A illustrates another example of a procedure that supports techniques for measuring RTT in accordance with aspects of the present disclosure.
Figure 3B:
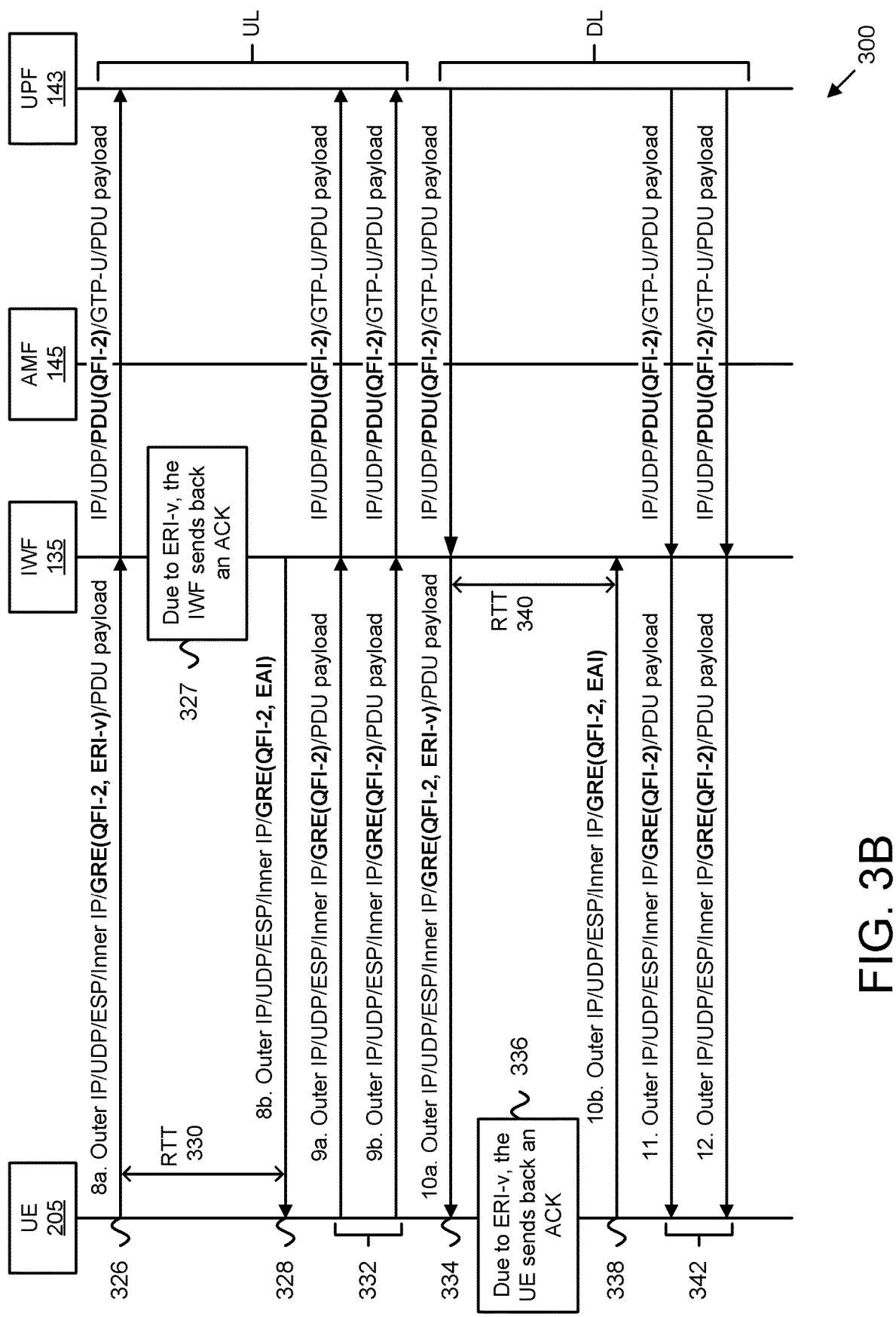
FIG. 3B illustrates a continuation of the procedure depicted in FIG. 3A.
Figure 3C:
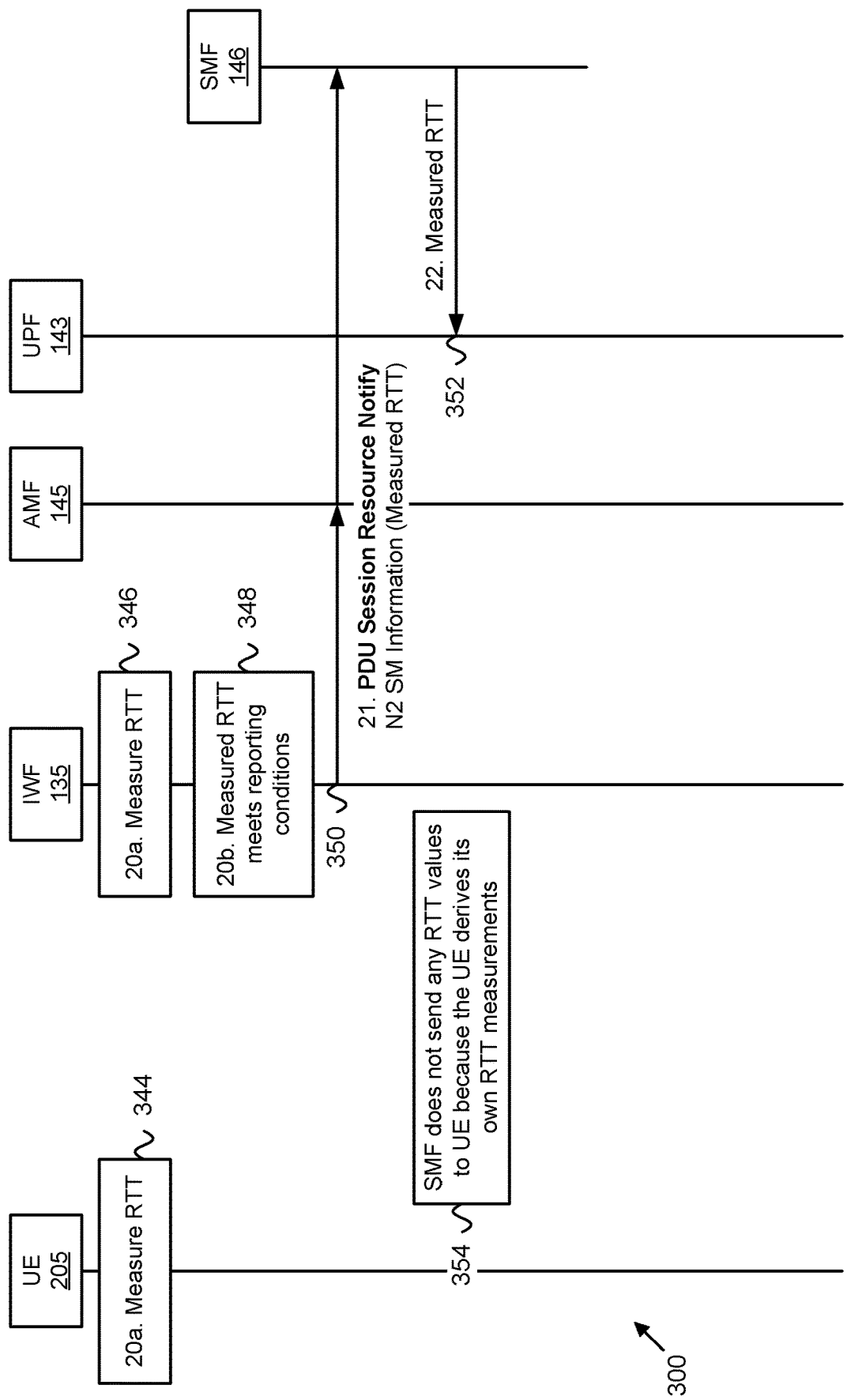
FIG. 3C illustrates a continuation of the procedure depicted in FIGS. 3A-B.

FIGS. 3A-3C depicts a second procedure 300 for measuring RTT of an access network, in accordance with aspects of the present disclosure. In the second procedure 300, the UE 205 takes its own RTT measurements and does not need to receive the RTT measured by the network. Note that the second procedure 300 primarily supports the first use case as the UE is aware of the RTT. The second procedure 300 involves a UE 205, the IWF 135, the UPF 143, the AMF 145, and the SMF 146. Recall that the UPF 143 can send user traffic over either the 3GPP access or the non-3GPP access.

At FIG. 3A, the second procedure 300 begins with the UE 205 establishing one or more IPsec SAs for NAS signaling with the IWF 135 (see operation 302). In some embodiments, the IWF 135 is an TNGF. In other embodiments, the IWF 135 is a N3IWF.

At step 1, the UE 205 requests a PDU Session, e.g., by sending a PDU Session Establishment Request message (see operation 304). In this message, the UE 205 includes an indication (e.g., the new indication "support GRE-based RTT measurements") that shows it can support RTT measurements over non-3GPP access by using the techniques specified herein, which utilizes the GRE protocol.

Based on the received PCC rules for the MA PDU Session, the SMF 146 determines (1) access steering rules for the UE 205 (e.g., ATSSS rules), and (2) access steering rules for the UPF 143 (see operation 306). In addition, the SMF 146 determines what QoS flows should be established for the MA PDU Session and creates the associated QoS rules for the UE 205 and the associated QERs for the UPF 143.

In the depicted embodiment, the SMF 146 determines that (1) RTT measurements need to be obtained by the UE 205 and UPF 143 in order to determine which access has the "smallest delay" and (2) the RTT measurements should be obtained by using 5QI-2, i.e., the same 5QI applied for App-2, which should be steered with the "smallest delay" steering mode.

At step 2, the IWF 135 receives a PDU Session Resource Setup Request (see operation 308), which includes a PDU Session Establishment Accept message and a QoS Flow Setup Request List 310, which includes a list of three different QoS flows, each one corresponding to one of the three PCC rules considered above.

Note that for the second QoS flow (identified by QFI-2), the SMF 146 includes the parameter RFI Report Request, discussed above, which indicates to the IWF 135 that it should measure the RTT over this QoS flow and it should report the measured RTT to the SMF 146 based on some reporting conditions. Note that the SMF 146 does not send the RTT Report Request parameter to the IWF 135 unless the UE 205 indicates it can "support GRE-based RTT measurements" (in step 1).

At step 3, the IWF 135, as normally, determines the number of child IPsec SAs to be established, which one carrying one or more of the three QoS flows decided by the PCF for the MA PDU Session (see operation 312). In the example depicted in FIG. 3A, the IWF 135 decides to establish two child IPsec SAs: the first carrying the traffic of QoS flow 1 and the traffic of QoS flow 2 (identified by QFI-1 and QFI-2 respectively), and the second carrying the traffic of QoS flow 3 (identified by QFI-3).

At step 4, the IWF 135 sends messages to the UE 205 to establish the determined number of child IPsec SAs (see operation 314 and operation 316). At step 5, the IWF 135 forwards to the UE 205 the PDU Session Establishment Accept message received in step 2 (see operation 318). Here, the UE 205 is also informed that it should take RTT measurements over the second QoS flow (QFI-2). This can be achieved by including either a new Information Element ("IE") in the PDU Session Establishment Accept message, or by extending the existing Authorized QoS rules IE so that it can specify, not only the traffic that should be mapped to QFI-2, but only if RTT measurements should be taken using QFI-2.

At step 6, the IWF 135 responds to the request received in the step 2 with a PDU Session Resource Setup Response message, indicating that the radio access resources for the PDU Session have been successfully established over non-3GPP access (see operation 320).

At step 7, the UE 205 and the UPF 143 may start UP communication over the non-3GPP access of the PDU Session (see operation 322 and operation 324). In addition to UP communication, both the UE 205 and the IWF 135 may start RTT measurements over the second QoS flow (e.g., QFI-2).

Continuing at FIG. 3B, at step 8, in the UL direction, the UE 205 sends UP traffic (i.e., a series of PDU payloads) to the IWF 135 and encapsulates each PDU payload with GRE (see UL operation 326). As normally, the GRE header includes the QFI associated with the encapsulated PDU payload. FIG. 3B shows only PDU payloads associated with QFI-2 for ease of illustration, however, PDU payloads associated with QFI-1 and QFI-3 will also be sent. The IWF 135 forwards every PDU payload received from the UE 205 to the UPF 143 over the N3 interface, which utilizes GTP-U encapsulation.

When the UE 205 wants to measure the RTT, the UE 205 includes an ERI indicator in the GRE header (either ERI-v or ERI-d, as discussed above with reference to FIG. 2). At step 8a, the UE 205 includes the ERI-v indicator. When the IWF 135 receives a GRE packet with the ERI in the header, it immediately responds with a GRE packet that contains an EAI (see operation 327 and operation 328). The UE 205 measures the RTT 330 by computing the time difference between the transmitted GRE packet with the ERI and the received GRE packet with the EAI. At step 9, more PDU payloads are forwarded by the UE 205 to the IWF 135, here without an ERI indicator (see operation 332).

In the DL direction, the UPF 143 sends UP traffic (i.e., a series of PDU payloads) to the IWF 135 over the N3 interface. In turn, the IWF 135 encapsulates these PDU payloads with GRE, and forwards them to the UE 205. As normally, the GRE header includes the QoS Flow Identifier ("QFI") associated with the encapsulated PDU payload.

However, at step 10 when the IWF 135 wants to measure the RTT 340, the IWF 135 includes a new indicator in the GRE header, referred to as an ERI (see operation 334). When the UE 205 receives a GRE packet with the ERI in the header, it immediately responds with a GRE packet that contains an EAI (see operation 336 and operation 338). This GRE packet does not contain a PDU payload; it is only an acknowledgment that aids the IWF 135 measure the current RTT between the UE 205 and IWF 135. The IWF 135 measures the RTT 340 by computing the time difference between the transmitted GRE packet with the ERI and the received GRE packet with the EAI. As discussed above, not all DL traffic includes an ERI. At steps 11-12, more PDU payloads are forwarded to the UE 205 from the IWF 135 without an ERI indicator (see operation 342).

Although not depicted in FIG. 3B, the UE 205 may send a GRE packet with a dummy payload and the ERI-d indicator to the IWF 135 in order to take a RTT measurement when there is no UL traffic to deliver. Similarly, the IWF 135 may send a GRE packet with a dummy payload and the ERI-d indicator to the UE 205 in order to take a RTT measurement when there is no DL traffic to deliver.

Continuing at FIG. 3C, at step 20, the UE 205 measures RTT (see operation 344) and the IWF 135 measures RTT (see operation 346), e.g., using the procedures described above. At step 20b, the IWF 135 decides to report to SMF 146 the measured (and averaged) RTT (see operation 348). Here the decision is made according to the reporting conditions in the received RTT Report Request parameter (see step 2). At step 21, the IWF 135 sends to SMF 146, via the AMF 145, the measured (and averaged) RTT, e.g., within a PDU Session Resource Notify message (see operation 350). Alternatively, the IWF 135 could send the measured RTT to UPF 143 and the UPF 143 may then forward it to SMF 146.

In various embodiments, only the IWF 135 reports the RTT to the SMF 146. This approach conserves radio resources by not requiring the UE 205 to report RTT to the SMF 146.

At step 22, the SMF 146 forwards the measured RTT received from the IWF 135 to the UPF 143 (see operation 352); however, the SMF 146 does not send any RTT values to the UE 205 (i.e., because the UE 205 derives its own RTT measurements). This step of forwarding the measured RTT is only needed when, in step 21, the IWF 135 sends the measured RTT to SMF 146 (i.e., it is not needed when, in step 21, the IWF 135 sends the measured RTT to UPF 143). Note, however, that, in this case, the RTT over the N3 interface (i.e., between the IWF 135 and UPF 143) is not added. This is because the RTT received by the UPF 143 should be similar with the RTT calculated by the UE 205, which does not include the RTT over the N3 interface. It is important that both the UE 205 and UPF 143 can take their traffic steering decisions based on similar RTT values.

If the UE 205 and UPF 143 need to know the RTT that characterizes the entire path between the UE 205 and UPF 143 over non-3GPP access (i.e., RTT between the UE 205 and the IWF 135 plus RTT over N3 interface), then they could increase the obtained RTT by a certain, fixed value. This value can be either preconfigured in the UE 205 and UPF 143 or could be signaled to UE 205 (e.g., in step 5) and to UPF 143 (e.g., in a step not shown in FIGS. 4A-4C) during the PDU Session establishment procedure.

Figure 4:
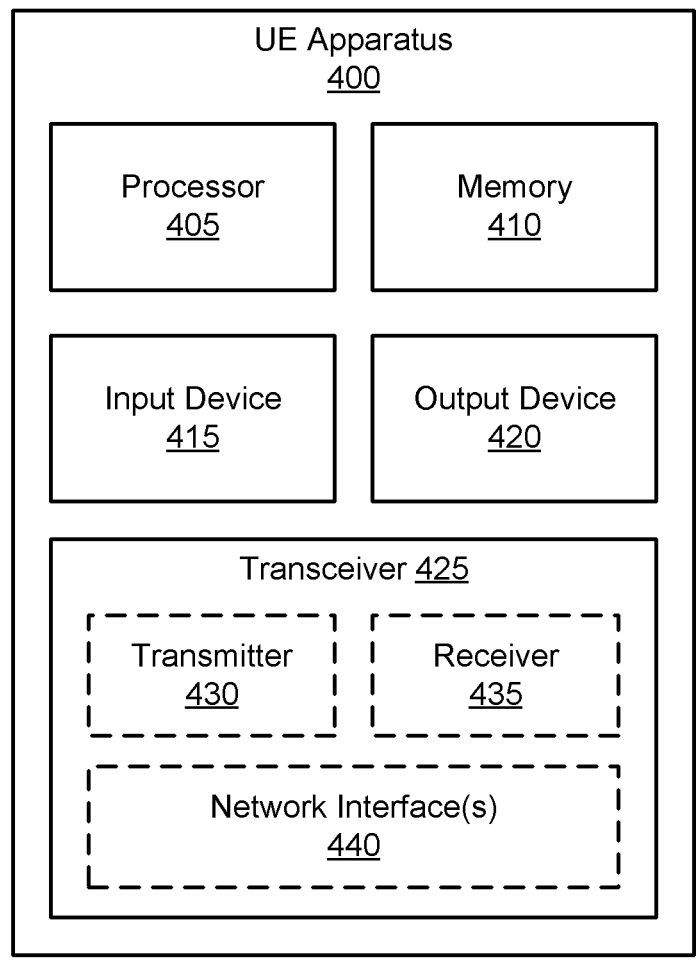
FIG. 4 illustrates an example of a UE apparatus that supports techniques for measuring RTT in accordance with aspects of the present disclosure.

FIG. 4 depicts one embodiment of a UE apparatus 400 that may be used for measuring RTT, in accordance with aspects of the present disclosure. The UE apparatus 400 may be one embodiment of the remote unit 105. Furthermore, the UE apparatus 400 may include a processor 405, a memory 410, an input device 415, an output device 420, a transceiver 425. In some embodiments, the input device 415 and the output device 420 are combined into a single device, such as a touch screen. In certain embodiments, the UE apparatus 400 does not include any input device 415 and/or output device 420.

As depicted, the transceiver 425 includes at least one transmitter 430 and at least one receiver 435. Here, the transceiver 425 communicates with a mobile core network (e.g., a 5GC) via an IWF (e.g., TNGF or N3IWF) and over a non-3GPP access network. Additionally, the transceiver 425 may support at least one network interface 440. Here, the at least one network interface 440 facilitates communication with an eNB or gNB (e.g., using the "Uu" interface). Additionally, the at least one network interface 440 may include an interface used for communications with an UPF, an SMF, and/or a P-CSCF.

The processor 405, in one embodiment, may include any known controller capable of executing computer-readable instructions and/or capable of performing logical operations. For example, the processor 405 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 405 executes instructions stored in the memory 410 to perform the methods and routines described herein. The processor 405 is communicatively coupled to the memory 410, the input device 415, the output device 420, and the transceiver 425.

In various embodiments, the processor 405 transmits a first request to establish a data connection between the UE apparatus 400 and the mobile core network, wherein the first request includes a first indicator that the UE apparatus 400 supports RTT measurements, the RTT measurements calculated using messages transmitted via the data connection and using an encapsulation header. The processor 405 receives a first message from the IWF and transmits a second message to the IWF, wherein the first message includes a first encapsulation header (e.g., a GRE header) comprising an echo request indication (e.g., an ERI) and the second message includes a second encapsulation header (e.g., a GRE header) comprising an echo response indication (e.g., an EAI).

In some embodiments, the processor 405 further receives a first notification from the mobile core network (e.g., a DL NAS Transport message), wherein the first notification comprises an average RTT derived based on RTT measurements calculated by the IWF. For example, the average RTT may be calculated by combining the RTT measurements calculated by the IWF with an average RTT for the path between the IWF and a UPF in the mobile core network.

In some embodiments, the first message contains a dummy PDU. In such embodiments, the processor 405 sends the second message while ignoring the dummy PDU. In some embodiments, the first message comprises a DL PDU sent by a UPF in the mobile core network via the IWF. In such embodiments, the DL PDU is encapsulated by the first encapsulation header.

In various embodiments, the first encapsulation header is a packet header complying with the GRE protocol. In some embodiments, the echo request indication comprises a set of bits in the GRE header. In one embodiment, the set of bits comprises a single bit. In other embodiments, the set of bits comprises multiple bits.

In certain embodiments, the echo request indication uses a first value (e.g., ERI-v) to indicate that a packet payload associated with the GRE header contains a PDU received from the mobile core network and uses a second value (e.g., ERI-d) to indicate that the packet payload contains dummy PDU that is to be ignored. In such embodiments, the second encapsulation header also may be a packet header complying with the GRE protocol, with the echo response indication comprising a set of bits in the GRE header. In such embodiments, the echo response indication may use a third value to acknowledge the echo request (see, e.g., Table 1).

In some embodiments, the processor 405 further transmits a third message to the IWF by using the first QoS flow of the data connection, wherein the third message includes the first encapsulation header (e.g., GRE header) comprising a second echo request indication. Here, the processor 405 may receive a fourth message from the IWF and measure the RTT for a first QoS flow of the data connection using the echo response indication, wherein the fourth message includes the second encapsulation header (e.g., GRE header) comprising a second echo response indication (e.g., an Echo ACK indication). In some such embodiments, the third message contains a dummy PDU, wherein the IWF sends the fourth message while ignoring the dummy PDU. In other embodiments, the third message contains an UL PDU encapsulated by the first encapsulation header, wherein the UL PDU is to be forwarded to the mobile core network via the IWF.

The memory 410, in one embodiment, is a computer readable storage medium. In some embodiments, the memory 410 includes volatile computer storage media. For example, the memory 410 may include a RAM, including dynamic RAM ("DRAM"), synchronous dynamic RAM ("SDRAM"), and/or static RAM ("SRAM"). In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media. In some embodiments, the memory 410 stores data relating to measuring RTT, for example storing a transmission table, and the like. In certain embodiments, the memory 410 also stores program code and related data, such as an operating system ("OS") or other controller algorithms operating on the UE apparatus 400 and one or more software applications.

The input device 415, in one embodiment, may include any known computer input device including a touch panel, a button, a keyboard, a stylus, a microphone, or the like. In some embodiments, the input device 415 may be integrated with the output device 420, for example, as a touchscreen or similar touch-sensitive display. In some embodiments, the input device 415 includes a touchscreen such that text may be input using a virtual keyboard displayed on the touchscreen and/or by handwriting on the touchscreen. In some embodiments, the input device 415 includes two or more different devices, such as a keyboard and a touch panel.

The output device 420, in one embodiment, may include any known electronically controllable display or display device. The output device 420 may be designed to output visual, audible, and/or haptic signals. In some embodiments, the output device 420 includes an electronic display capable of outputting visual data to a user. For example, the output device 420 may include, but is not limited to, an LCD display, an LED display, an OLED display, a projector, or similar display device capable of outputting images, text, or the like to a user. As another, non-limiting, example, the output device 420 may include a wearable display such as a smart watch, smart glasses, a heads-up display, or the like. Further, the output device 420 may be a component of a smart phone, a personal digital assistant, a television, a table computer, a notebook (laptop) computer, a personal computer, a vehicle dashboard, or the like.

In certain embodiments, the output device 420 includes one or more speakers for producing sound. For example, the output device 420 may produce an audible alert or notification (e.g., a beep or chime). In some embodiments, the output device 420 includes one or more haptic devices for producing vibrations, motion, or other haptic feedback. In some embodiments, all or portions of the output device 420 may be integrated with the input device 415. For example, the input device 415 and output device 420 may form a touchscreen or similar touch-sensitive display. In other embodiments, all or portions of the output device 420 may be located near the input device 415.

As discussed above, the transceiver 425 communicates with one or more network functions of a mobile communication network via one or more access networks. The transceiver 425 operates under the control of the processor 405 to transmit messages, data, and other signals and also to receive messages, data, and other signals. For example, the processor 405 may selectively activate the transceiver (or portions thereof) at particular times in order to send and receive messages. The transceiver 425 may include one or more transmitters 430 and one or more receivers 435. In certain embodiments, the one or more transmitters 430 and/or the one or more receivers 435 may share transceiver hardware and/or circuitry. For example, the one or more transmitters 430 and/or the one or more receivers 435 may share antenna(s), antenna tuner(s), amplifier(s), filter(s), oscillator(s), mixer(s), modulator/demodulator(s), power supply, and the like.

In various embodiments, the transceiver 425 is configured to communication with 3GPP access network(s) 120 and the non-3GPP access network(s) 130. In some embodiments, the transceiver 425 implements modem functionality for the 3GPP access network(s) 120 and/or the non-3GPP access network(s) 130. In one embodiment, the transceiver 425 implements multiple logical transceivers using different communication protocols or protocol stacks, while using common physical hardware. For example, the transceiver 425 may include one application-specific integrated circuit ("ASIC") which includes the function of first transceiver and second transceiver for accessing different networks. In other embodiments, the transceiver 425 comprises separate transceivers for the 3GPP access network(s) and for the non-3GPP access network(s).

Figure 5:
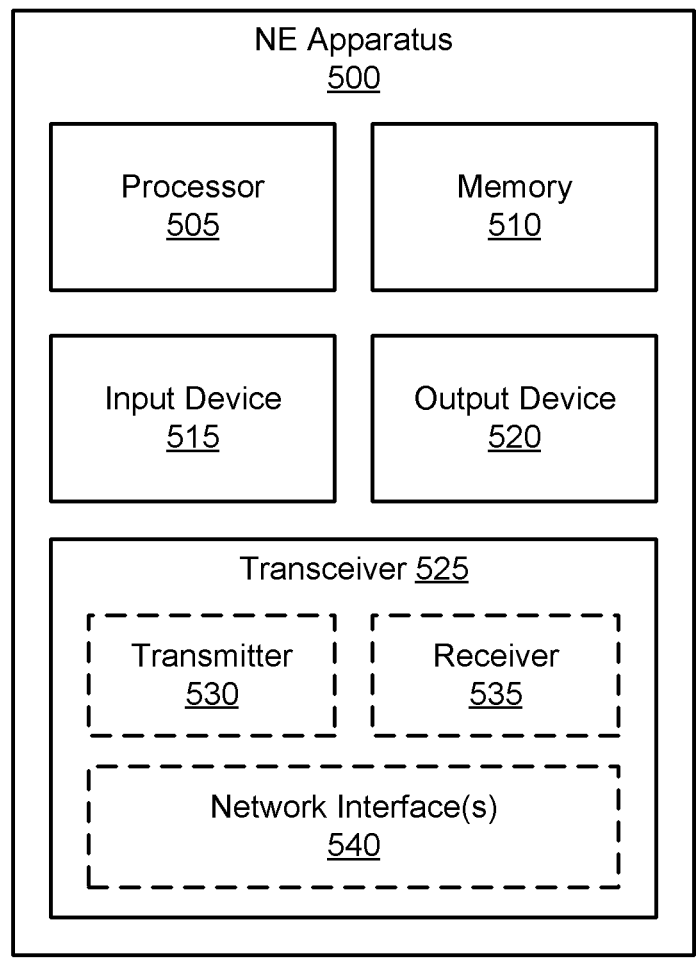
FIG. 5 illustrates an example of a network equipment ("NE") apparatus that supports techniques for measuring RTT in accordance with aspects of the present disclosure.

FIG. 5 depicts one embodiment of a network equipment ("NE") apparatus 500 that may be used for measuring RTT, in accordance with aspects of the present disclosure. The NE apparatus 500 may be one embodiment of the IWF 135, such as a TNGF or a N3IWF. Furthermore, NE apparatus 500 may include a processor 505, a memory 510, an input device 515, an output device 520, a transceiver 525. In some embodiments, the input device 515 and the output device 520 are combined into a single device, such as a touch screen. In certain embodiments, the NE apparatus 500 does not include any input device 515 and/or output device 520.

As depicted, the transceiver 525 includes at least one transmitter 530 and at least one receiver 535. Here, the transceiver 525 communicates with one or more remote units 105 and with one or more IWFs 135 that provide access to one or more PLMNs Additionally, the transceiver 525 may support at least one network interface 540. In some embodiments, the transceiver 525 supports a first interface (e.g., an N2 interface) that communicates with control-plane functions (e.g., SMF) in a mobile core network (e.g., a 5GC) and a second interface that communicates with a remote unit (e.g., UE) over a non-3GPP access network.

The processor 505, in one embodiment, may include any known controller capable of executing computer-readable instructions and/or capable of performing logical operations. For example, the processor 505 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 505 executes instructions stored in the memory 510 to perform the methods and routines described herein. The processor 505 is communicatively coupled to the memory 510, the input device 515, the output device 520, and the first transceiver 525.

In various embodiments, the processor 505 receives a request via the first interface to establish access resources for enabling data communication between the remote unit and the mobile core network via a data connection. Here, the data connection supports a plurality of QoS flows and the request includes a first indicator (e.g., a RTT Report Request) that requests RTT measurements using a first QoS flow. The processor 505 transmits a first message to the remote unit via the second interface and using the first QoS flow of the data connection, wherein the first message includes a first encapsulation header (e.g., GRE header) comprising an echo request indication. The processor 505 receives a second message via the second interface, wherein the second message includes a second encapsulation header (e.g., GRE header) comprising an echo response indication (e.g., an Echo ACK indication) and measures the RTT for the first QoS flow of the data connection using the echo response indication.

In some embodiments, the processor 505 further determines whether an average RTT meets a reporting condition and transmits a first notification via the first interface in response to the average RTT meeting the reporting condition. In such embodiments, the average RTT may be based on the measured RTT. In certain embodiments, the processor 505 determines whether an average RTT meets a reporting condition by evaluating the one or more reporting conditions included in the first indicator. In further embodiments, the processor 505 may forward via the second interface a second notification received via the first interface, wherein the second notification comprises the average RTT.

In some embodiments, the NE apparatus 500 supports a third interface (e.g., N3) that communicates with a UPF in the mobile core network (e.g., UPF 143). Here, the first message may contain a PDU received via the third interface. In some embodiments, the first message contains a dummy PDU. In such embodiments, the remote unit sends the second message while ignoring the dummy PDU. In certain embodiments, the processor 505 determines whether an average RTT meets a reporting condition and controls the transceiver 525 to transmit a notification via the third interface in response to the average RTT meeting the reporting condition, wherein the average RTT is based on the measured RTT. Note that the UPF may forward the reported average RTT to the SMF. In one embodiment, the UPF adds the RTT of the third interface (e.g., N3 interface) to the RTT (e.g., RAN-RTT) reported by the NE apparatus 500.

In some embodiments, the first encapsulation header is a packet header complying with the GRE protocol. In certain embodiments, the first message includes the GRE header comprising the echo request indication in response to receiving the first indicator requesting RTT measurements. In certain embodiments, the echo request indication comprises a set of bits in the GRE header. In one embodiment, the set of bits comprises a single bit. In other embodiments, the set of bits comprises multiple bits.

In various embodiments, the echo request indication uses a first value to indicate that a packet payload associated with the GRE header contains a PDU received via the third interface and uses a second value to indicate that the packet payload contains dummy PDU that is to be ignored by the remote unit.

In some embodiments, the second encapsulation header is a packet header complying with the GRE protocol, wherein the echo response indication comprises a set of bits in the GRE header. In one embodiment, the echo response indication comprises a single bit within the GRE header. In other embodiments, the echo response indication comprises multiple bits within the GRE header. In various embodiments, the echo response indication uses a third value to acknowledge the echo request.

In some embodiments, the processor 505 receives a third message from the remote unit via the second interface by using the first QoS flow of the data connection. Here, the third message includes the first encapsulation header (e.g., GRE header) comprising a second echo request indication. The processor 505 also transmits a fourth message via the second interface. Here, the fourth message includes the second encapsulation header (e.g., GRE header) comprising a second echo response indication (e.g., an Echo ACK indication), wherein the remote unit measures the RTT for the first QoS flow of the data connection using the echo response indication.

In certain embodiments, the third message contains a dummy PDU encapsulated by the first encapsulation header. In such embodiments, the processor 505 sends the fourth message while ignoring the dummy PDU. In certain embodiments, the third message contains an UL PDU encapsulated by the first encapsulation header. In such embodiments, the processor 505 may send the fourth message and forward the UL PDU to the mobile core network via the third interface.

The memory 510, in one embodiment, is a computer readable storage medium. In some embodiments, the memory 510 includes volatile computer storage media. For example, the memory 510 may include a RAM, including dynamic RAM ("DRAM"), synchronous dynamic RAM ("SDRAM"), and/or static RAM ("SRAM"). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media. In some embodiments, the memory 510 stores data relating to measuring RTT, for example storing a transmission table, and the like. In certain embodiments, the memory 510 also stores program code and related data, such as an operating system ("OS") or other controller algorithms operating on the NE apparatus 500 and one or more software applications.

The input device 515, in one embodiment, may include any known computer input device including a touch panel, a button, a keyboard, a stylus, a microphone, or the like. In some embodiments, the input device 515 may be integrated with the output device 520, for example, as a touchscreen or similar touch-sensitive display. In some embodiments, the input device 515 includes a touchscreen such that text may be input using a virtual keyboard displayed on the touchscreen and/or by handwriting on the touchscreen. In some embodiments, the input device 515 includes two or more different devices, such as a keyboard and a touch panel.

The output device 520, in one embodiment, may include any known electronically controllable display or display device. The output device 520 may be designed to output visual, audible, and/or haptic signals. In some embodiments, the output device 520 includes an electronic display capable of outputting visual data to a user. For example, the output device 520 may include, but is not limited to, an LCD display, an LED display, an OLED display, a projector, or similar display device capable of outputting images, text, or the like to a user. As another, non-limiting, example, the output device 520 may include a wearable display such as a smart watch, smart glasses, a heads-up display, or the like. Further, the output device 520 may be a component of a smart phone, a personal digital assistant, a television, a table computer, a notebook (laptop) computer, a personal computer, a vehicle dashboard, or the like.

In certain embodiments, the output device 520 includes one or more speakers for producing sound. For example, the output device 520 may produce an audible alert or notification (e.g., a beep or chime). In some embodiments, the output device 520 includes one or more haptic devices for producing vibrations, motion, or other haptic feedback. In some embodiments, all or portions of the output device 520 may be integrated with the input device 515. For example, the input device 515 and output device 520 may form a touchscreen or similar touch-sensitive display. In other embodiments, all or portions of the output device 520 may be located near the input device 515.

As discussed above, the transceiver 525 may communicate with one or more remote units and/or with one or more IWFs that provide access to one or more PLMNs. The transceiver 525 may also communicate with one or more network functions (e.g., in the mobile core network 140). The transceiver 525 operates under the control of the processor 505 to transmit messages, data, and other signals and also to receive messages, data, and other signals. For example, the processor 505 may selectively activate the transceiver (or portions thereof) at particular times in order to send and receive messages.

The transceiver 525 may include one or more transmitters 530 and one or more receivers 535. In certain embodiments, the one or more transmitters 530 and/or the one or more receivers 535 may share transceiver hardware and/or circuitry. For example, the one or more transmitters 530 and/or the one or more receivers 535 may share antenna(s), antenna tuner(s), amplifier(s), filter(s), oscillator(s), mixer(s), modulator/demodulator(s), power supply, and the like. In one embodiment, the transceiver 525 implements multiple logical transceivers using different communication protocols or protocol stacks, while using common physical hardware.

Figure 6:
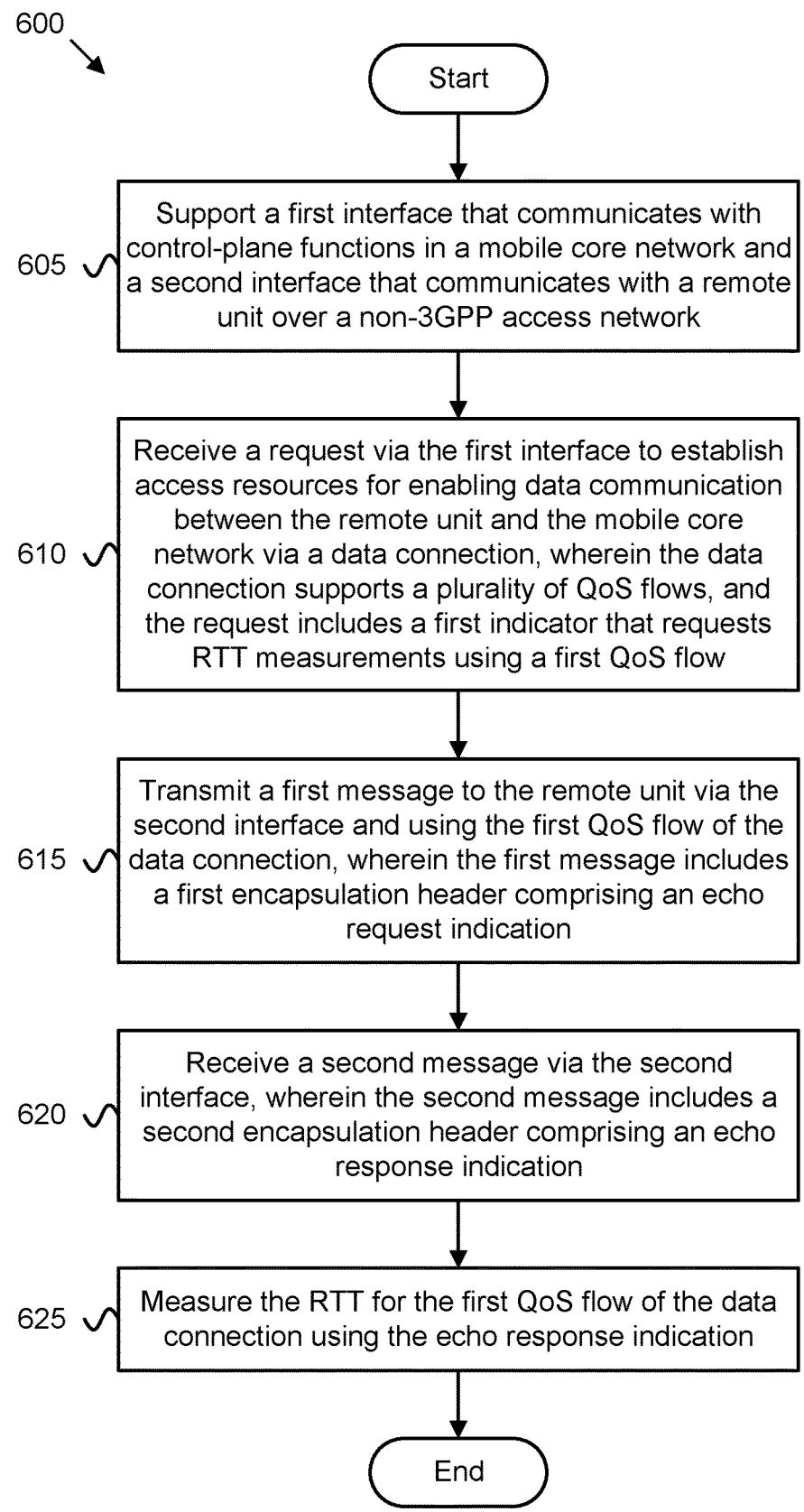
FIG. 6 illustrates a flowchart of a first method that supports techniques for measuring RTT in accordance with aspects of the present disclosure.

FIG. 6 depicts a method 600 for measuring RTT, in accordance with aspects of the present disclosure. In some embodiments, the method 600 is performed by an apparatus, such as the IWF 135 and/or the NE apparatus 500. In certain embodiments, the method 600 may be performed by a processor executing program code, for example, a microcontroller, a microprocessor, a CPU, a GPU, an auxiliary processing unit, a FPGA, or the like.

The method 600 begins with supporting 605 a first interface (e.g., an N2 interface) that communicates with control-plane functions in a mobile core network (e.g., a 5GC) and a second interface that communicates with a remote unit over a non-3GPP access network.

The method 600 includes receiving 610 a request via the first interface to establish access resources for enabling data communication between the remote unit and the mobile core network via a data connection. Here, the data connection supports a plurality of QoS flows and the request includes a first indicator (e.g., a RTT Report Request) that requests RTT measurements using a first QoS flow.

The method 600 includes transmitting 615 a first message to the remote unit via the second interface and using the first QoS flow of the data connection, wherein the first message includes a first encapsulation header (e.g., GRE header) comprising an echo request indication.

The method 600 includes receiving 620 a second message via the second interface, wherein the second message includes a second encapsulation header (e.g., GRE header) comprising an echo response indication (e.g., an Echo ACK indication).

The method 600 includes measuring 625 the RTT for the first QoS flow of the data connection using the echo response indication. The method 600 ends.

Figure 7:
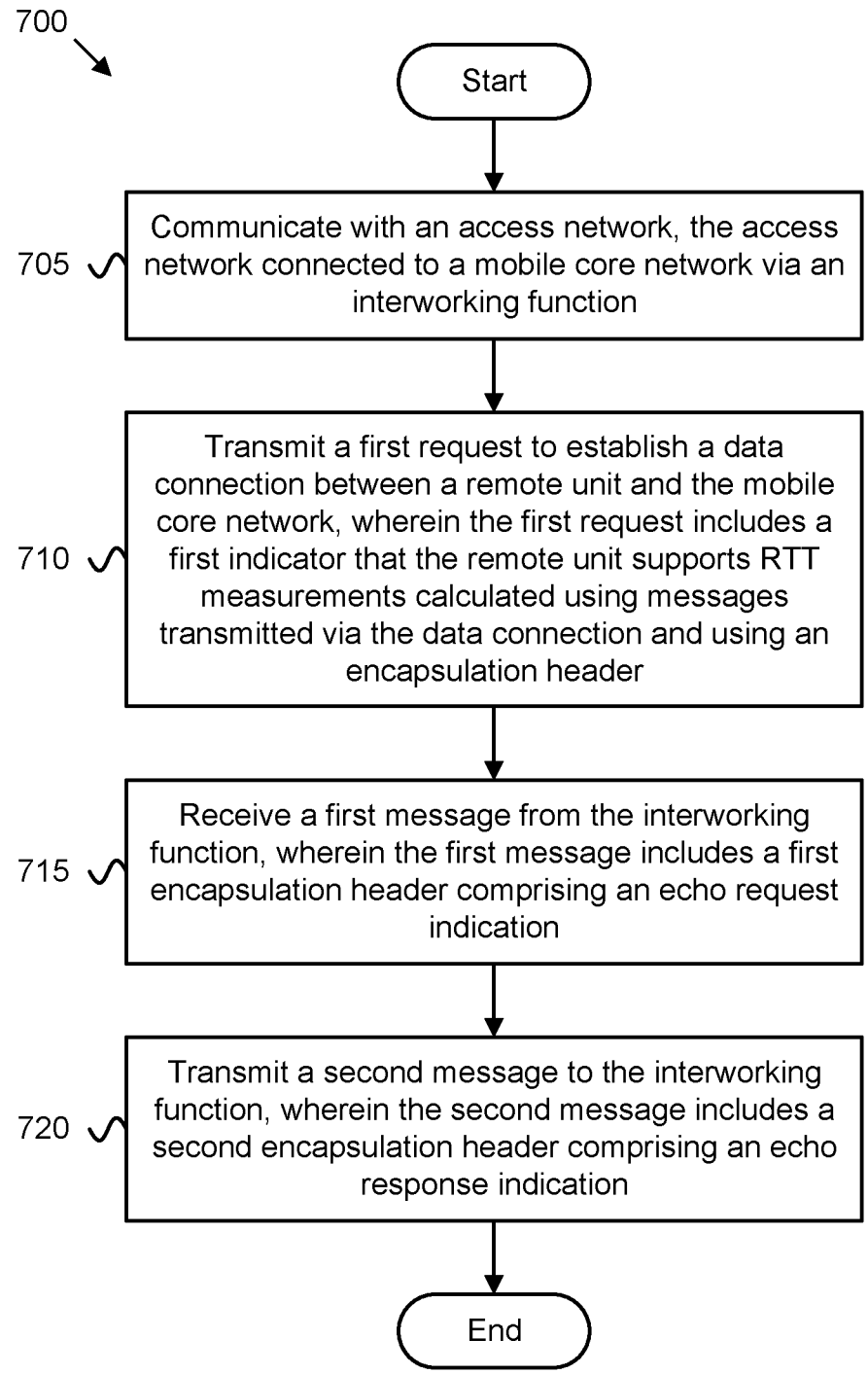
FIG. 7 illustrates a flowchart of a second method that supports techniques for measuring RTT in accordance with aspects of the present disclosure.

FIG. 7 depicts a method 700 for measuring RTT, in accordance with aspects of the present disclosure. In some embodiments, the method 700 is performed by an apparatus, such as the remote unit 105, the UE 205, and/or the UE apparatus 400. In certain embodiments, the method 700 may be performed by a processor executing program code, for example, a microcontroller, a microprocessor, a CPU, a GPU, an auxiliary processing unit, a FPGA, or the like.

The method 700 begins and communicates 705 with an access network, the access network connected to a mobile core network (e.g., a 5GC) via an IWF (e.g., TNGF or N3IWF).

The method 700 includes transmitting 710 a first request to establish a data connection between the remote unit and the mobile core network. Here, the first request includes a first indicator that the remote unit supports RTT measurements calculated using messages transmitted via the data connection and using an encapsulation header.

The method 700 includes receiving 715 a first message from the IWF. Here, the first message includes a first encapsulation header (e.g., a GRE header) comprising an echo request indication.

The method 700 includes transmitting 720 a second message to the IWF. Here, the second message includes a second encapsulation header (e.g., a GRE header) comprising an echo response indication (e.g., an Echo ACK indication). The method 700 ends.

Disclosed herein is a first apparatus for measuring RTT, in accordance with aspects of the present disclosure. The first apparatus may be implemented by an IWF, such as a TNGF or N3IWF. The first apparatus includes a first interface (e.g., an N2 interface) that communicates with control-plane functions in a mobile core network (e.g., a 5GC) and a second interface that communicates with a remote unit over a non-3GPP access network. The first apparatus includes a processor that receives a request via the first interface to establish access resources for enabling data communication between the remote unit and the mobile core network via a data connection. Here, the data connection supports a plurality of QoS flows and the request includes a first indicator (e.g., a RTT Report Request) that requests RTT measurements using a first QoS flow. The processor transmits a first message to the remote unit via the second interface and using the first QoS flow of the data connection, wherein the first message includes a first encapsulation header (e.g., GRE header) comprising an echo request indication. The processor receives a second message via the second interface, wherein the second message includes a second encapsulation header (e.g., GRE header) comprising an echo response indication (e.g., an Echo ACK indication) and measures the RTT for the first QoS flow of the data connection using the echo response indication.

In some embodiments, the processor further determines whether an average RTT meets a reporting condition and transmits a first notification via the first interface in response to the average RTT meeting the reporting condition. In such embodiments, the average RTT may be based on the measured RTT. In certain embodiments, the processor determines whether an average RTT meets a reporting condition by evaluating the one or more reporting conditions included in the first indicator. In further embodiments, the processor may forward via the second interface a second notification received via the first interface, wherein the second notification comprises the average RTT.

In some embodiments, the first apparatus includes a third interface (e.g., N3) that communicates with a UPF in the mobile core network. Here, the first message may contain a PDU received via the third interface. In some embodiments, the first message contains a dummy PDU. In such embodiments, the remote unit sends the second message while ignoring the dummy PDU. In certain embodiments, the processor determines whether an average RTT meets a reporting condition and transmits a notification via the third interface in response to the average RTT meeting the reporting condition, wherein the average RTT is based on the measured RTT.

In some embodiments, the first encapsulation header is a packet header complying with the GRE protocol. In certain embodiments, the first message includes the GRE header comprising the echo request indication in response to receiving the first indicator requesting RTT measurements. In certain embodiments, the echo request indication comprises a set of bits in the GRE header. In one embodiment, the set of bits comprises a single bit. In other embodiments, the set of bits comprises multiple bits.

In various embodiments, the echo request indication uses a first value to indicate that a packet payload associated with the GRE header contains a PDU received via the third interface and uses a second value to indicate that the packet payload contains dummy PDU that is to be ignored by the remote unit.

In some embodiments, the second encapsulation header is a packet header complying with the GRE protocol, wherein the echo response indication comprises a set of bits in the GRE header. In one embodiment, the echo response indication comprises a single bit within the GRE header. In other embodiments, the echo response indication comprises multiple bits within the GRE header. In various embodiments, the echo response indication uses a third value to acknowledge the echo request.

In some embodiments, the processor receives a third message from the remote unit via the second interface by using the first QoS flow of the data connection. Here, the third message includes the first encapsulation header (e.g., GRE header) comprising a second echo request indication. The processor also transmits a fourth message via the second interface. Here, the fourth message includes the second encapsulation header (e.g., GRE header) comprising a second echo response indication (e.g., an Echo ACK indication), wherein the remote unit measures the RTT for the first QoS flow of the data connection using the echo response indication.

In certain embodiments, the third message contains a dummy PDU encapsulated by the first encapsulation header. In such embodiments, the processor sends the fourth message while ignoring the dummy PDU. In certain embodiments, the third message contains an UL PDU encapsulated by the first encapsulation header. In such embodiments, the processor may send the fourth message and forward the UL PDU to the mobile core network via the third interface. In various embodiments, the processor further receives a measurement parameter via the first interface, wherein the measurement parameter indicates a frequency for measuring RTT.

Disclosed herein is a first method for measuring RTT, in accordance with aspects of the present disclosure. The first method may be performed by an IWF, such as a TNGF or N3IWF. The first method includes supporting a first interface (e.g., an N2 interface) that communicates with control-plane functions in a mobile core network (e.g., a 5GC) and a second interface that communicates with a remote unit over a non-3GPP access network. The first method includes receiving a request via the first interface to establish access resources for enabling data communication between the remote unit and the mobile core network via a data connection. Here, the data connection supports a plurality of QoS flows and the request includes a first indicator (e.g., a RTT Report Request) that requests RTT measurements using a first QoS flow. The first method includes transmitting a first message to the remote unit via the second interface and using the first QoS flow of the data connection, wherein the first message includes a first encapsulation header (e.g., GRE header) comprising an echo request indication. The first method includes receiving a second message via the second interface, wherein the second message includes a second encapsulation header (e.g., GRE header) comprising an echo response indication (e.g., an Echo ACK indication). The first method includes measuring the RTT for the first QoS flow of the data connection using the echo response indication.

In some embodiments, the first method includes determining whether an average RTT meets a reporting condition and transmitting a first notification via the first interface in response to the average RTT meeting the reporting condition. In such embodiments, the average RTT may be based on the measured RTT. In certain embodiments, determining whether the average RTT meets a reporting condition includes evaluating the one or more reporting conditions included in the first indicator. In further embodiments, the first method may include forwarding via the second interface a second notification received via the first interface, wherein the second notification comprises the average RTT.

In some embodiments, the first method includes supporting a third interface (e.g., N3) that communicates with a UPF in the mobile core network. Here, the first message may contain a PDU received via the third interface. In some embodiments, the first message contains a dummy PDU. In such embodiments, the remote unit sends the second message while ignoring the dummy PDU. In certain embodiments, the first method includes determining whether an average RTT meets a reporting condition and transmitting a notification via the third interface in response to the average RTT meeting the reporting condition, wherein the average RTT is based on the measured RTT.

In some embodiments, the first encapsulation header is a packet header complying with the GRE protocol. In certain embodiments, the first message includes the GRE header comprising the echo request indication in response to receiving the first indicator requesting RTT measurements. In certain embodiments, the echo request indication comprises a set of bits in the GRE header. In one embodiment, the set of bits comprises a single bit. In other embodiments, the set of bits comprises multiple bits.

In various embodiments, the echo request indication uses a first value to indicate that a packet payload associated with the GRE header contains a PDU received via the third interface and uses a second value to indicate that the packet payload contains dummy PDU that is to be ignored by the remote unit.

In some embodiments, the second encapsulation header is a packet header complying with the GRE protocol, wherein the echo response indication comprises a set of bits in the GRE header. In one embodiment, the echo response indication comprises a single bit within the GRE header. In other embodiments, the echo response indication comprises multiple bits within the GRE header. In various embodiments, the echo response indication uses a third value to acknowledge the echo request.

In some embodiments, the first method includes receiving a third message from the remote unit via the second interface by using the first QoS flow of the data connection. Here, the third message includes the first encapsulation header (e.g., GRE header) comprising a second echo request indication. The first method may also include transmitting a fourth message via the second interface. Here, the fourth message includes the second encapsulation header (e.g., GRE header) comprising a second echo response indication (e.g., an Echo ACK indication), wherein the remote unit measures the RTT for the first QoS flow of the data connection using the echo response indication.

In certain embodiments, the third message contains a dummy PDU encapsulated by the first encapsulation header. In such embodiments, transmitting the fourth message comprises sending the fourth message while ignoring the dummy PDU. In certain embodiments, the third message contains an UL PDU encapsulated by the first encapsulation header. In such embodiments, the first method may include forwarding the UL PDU to the mobile core network via the third interface in response to receiving the third message. In various embodiments, the first method includes receiving a measurement parameter via the first interface, wherein the measurement parameter indicates a frequency for measuring RTT.

Disclosed herein is a second apparatus for measuring RTT, in accordance with aspects of the present disclosure. The second apparatus may be implemented by a remote unit, such as a UE. The second apparatus includes a transceiver that communicates with a mobile core network (e.g., a 5GC) via an IWF (e.g., TNGF or N3IWF) and over a non-3GPP access network. The second apparatus includes a processor that transmits a first request to establish a data connection between the second apparatus and the mobile core network, wherein the first request includes a first indicator that the second apparatus supports RTT measurements, the RTT measurements calculated using messages transmitted via the data connection and using an encapsulation header. The processor receives a first message from the IWF and transmits a second message to the IWF, wherein the first message includes a first encapsulation header (e.g., a GRE header) comprising an echo request indication and the second message includes a second encapsulation header (e.g., a GRE header) comprising an echo response indication (e.g., an Echo ACK indication).

In some embodiments, the processor further receives a first notification from the mobile core network (e.g., a DL NAS Transport message), wherein the first notification comprises an average RTT derived based on RTT measurements calculated by the IWF. For example, the average RTT may be calculated by combining the RTT measurements calculated by the IWF with an average RTT for the path between the IWF and a UPF in the mobile core network.

In some embodiments, the first message contains a dummy PDU. In such embodiments, the processor sends the second message while ignoring the dummy PDU. In some embodiments, the first message comprises a DL PDU sent by a UPF in the mobile core network via the IWF. In such embodiments, the DL PDU is encapsulated by the first encapsulation header.

In various embodiments, the first encapsulation header is a packet header complying with the GRE protocol. In some embodiments, the echo request indication comprises a set of bits in the GRE header. In one embodiment, the set of bits comprises a single bit. In other embodiments, the set of bits comprises multiple bits.

In certain embodiments, the echo request indication uses a first value to indicate that a packet payload associated with the GRE header contains a PDU received from the mobile core network and uses a second value to indicate that the packet payload contains dummy PDU that is to be ignored. In such embodiments, the second encapsulation header also may be a packet header complying with the GRE protocol, with the echo response indication comprising a set of bits in the GRE header. In such embodiments, the echo response indication may use a third value to acknowledge the echo request.

In some embodiments, the processor further transmits a third message to the IWF by using the first QoS flow of the data connection, wherein the third message includes the first encapsulation header (e.g., GRE header) comprising a second echo request indication. Here, the processor may receive a fourth message from the IWF and measure the RTT for a first QoS flow of the data connection using the echo response indication, wherein the fourth message includes the second encapsulation header (e.g., GRE header) comprising a second echo response indication (e.g., an Echo ACK indication). In some such embodiments, the third message contains a dummy PDU, wherein the IWF sends the fourth message while ignoring the dummy PDU. In other embodiments, the third message contains an UL PDU encapsulated by the first encapsulation header, wherein the UL PDU is to be forwarded to the mobile core network via the IWF.

Disclosed herein is a second method for measuring RTT, in accordance with aspects of the present disclosure. The second method may be performed by a UE, such as the remote unit 105, the UE 205, the UE apparatus 400. The second method includes communicating with an access network, the access network connected to a mobile core network (e.g., a 5GC) via an IWF (e.g., TNGF or N3IWF). The second method includes transmitting a first request to establish a data connection between the remote unit and the mobile core network. Here, the first request includes a first indicator that the remote unit supports RTT measurements calculated using messages transmitted via the data connection and using an encapsulation header. The second method includes receiving a first message from the IWF. Here, the first message includes a first encapsulation header (e.g., a GRE header) comprising an echo request indication. The second method includes transmitting a second message to the IWF. Here, the second message includes a second encapsulation header (e.g., a GRE header) comprising an echo response indication (e.g., an Echo ACK indication).

In some embodiments, the second method includes receiving a first notification from the mobile core network (e.g., a DL NAS Transport message), wherein the first notification comprises an average RTT derived based on RTT measurements calculated by the IWF. For example, the average RTT may be calculated by combining the RTT measurements calculated by the IWF with an average RTT for the path between the IWF and a UPF in the mobile core network.

In some embodiments, the first message contains a dummy PDU. In such embodiments, the second method includes sending the second message while ignoring the dummy PDU. In some embodiments, the first message comprises a DL PDU sent by a UPF in the mobile core network via the IWF. In such embodiments, the DL PDU is encapsulated by the first encapsulation header.

In various embodiments, the first encapsulation header is a packet header complying with the GRE protocol. In some embodiments, the echo request indication comprises a set of bits in the GRE header. In one embodiment, the set of bits comprises a single bit. In other embodiments, the set of bits comprises multiple bits.

In certain embodiments, the echo request indication uses a first value to indicate that a packet payload associated with the GRE header contains a PDU received from the mobile core network and uses a second value to indicate that the packet payload contains dummy PDU that is to be ignored. In such embodiments, the second encapsulation header also may be a packet header complying with the GRE protocol, with the echo response indication comprising a set of bits in the GRE header. In such embodiments, the echo response indication may use a third value to acknowledge the echo request.

In some embodiments, the second method includes transmitting a third message to the IWF by using the first QoS flow of the data connection, wherein the third message includes the first encapsulation header (e.g., GRE header) comprising a second echo request indication. Here, the second method may include receiving a fourth message from the IWF and measuring the RTT for a first QoS flow of the data connection using the echo response indication, wherein the fourth message includes the second encapsulation header (e.g., GRE header) comprising a second echo response indication (e.g., an Echo ACK indication). In some such embodiments, the third message contains a dummy PDU, wherein the IWF sends the fourth message while ignoring the dummy PDU. In other embodiments, the third message contains an UL PDU encapsulated by the first encapsulation header, wherein the UL PDU is to be forwarded to the mobile core network via the IWF.

Disclosed herein is a third apparatus for measuring RTT, in accordance with aspects of the present disclosure. The third apparatus may be implemented by a remote unit, such as a UE. The third apparatus includes a memory coupled to a processor, the memory including instructions executable by the processor to cause the third apparatus to: A) transmit a first request for establishing a data connection between the third apparatus and a mobile core network; B) receive, from an interworking function, a first message associated with the data connection, the first message including a first encapsulation packet header including an echo request indication, where the first encapsulation packet header complies with a GRE protocol; and C) transmit, to the interworking function, a second message in response to the first message, the second message including a second encapsulation packet header including an echo response indication, where the second encapsulation packet header complies with the GRE protocol.

In some embodiments, the first request includes a first indicator that the third apparatus supports a RTT measurement procedure based on messages transmitted via the data connection, where each of the messages includes an encapsulation packet header. In such embodiments, the instructions are executable by the processor to cause the third apparatus to receive a first notification indicating an average RTT value derived based on a plurality of RTT measurements.

In some embodiments, the first message includes a dummy PDU. In such embodiments, the instructions are executable by the processor to cause the third apparatus to transmit the second message and ignore the dummy PDU. In some embodiments, the first message includes a downlink PDU encapsulated by the first encapsulation packet header.

In some embodiments, the echo request indication includes a set of bits in the first encapsulation packet header. In certain embodiments, the echo request indication includes a first value for indicating that a packet payload associated with the first encapsulation packet header includes a PDU from the mobile core network, and wherein the echo request indication includes a second value for indicating that the packet payload includes a dummy PDU and for the third apparatus to ignore the dummy PDU. In further embodiments, the echo response indication includes a set of bits in the second encapsulation packet header, and wherein the echo response indication includes a third value for indicating an acknowledgement of the echo request indication.

In some embodiments, the instructions are executable by the processor to cause the third apparatus to: A) transmit, to the interworking function and using a first QoS flow of the data connection, a third message including a third encapsulation packet header including a second echo request indication, wherein the third encapsulation packet header complies with the GRE protocol; B) receive, from the interworking function, a fourth message including a fourth encapsulation packet header including a second echo response indication, wherein the fourth encapsulation packet header complies with the GRE protocol; and C) measure a RTT for the first QoS flow of the data connection based on the second echo response indication.

In certain embodiments, the third message includes a dummy PDU, and wherein the second echo request indication indicates that a packet payload including the dummy PDU and for the interworking function to ignore the dummy PDU. In certain embodiments, the third message includes an uplink PDU encapsulated by the third encapsulation packet header, and wherein the second echo request indication indicates that the uplink PDU is to be forwarded to the mobile core network.

Disclosed herein is a third method that supports techniques for measuring RTT, in accordance with aspects of the present disclosure. The third method may be performed by a UE, such as the remote unit 105, the UE 205, and/or the UE apparatus 400. The third method includes transmitting a first request for establishing a data connection between the UE and a mobile core network and receiving, from an IWF, a first message including a first encapsulation packet header including an echo request indication, where the first encapsulation packet header complies with a GRE protocol. The third method includes transmitting, to the IWF, a second message including a second encapsulation packet header including an echo response indication, where the second encapsulation packet header complies with the GRE protocol.

In some embodiments, the first request includes a first indicator that the UE supports a RTT measurement procedure based on messages transmitted via the data connection, where each of the messages includes an encapsulation packet header. In such embodiments, the third method includes receiving a first notification indicating an average RTT value derived based on a plurality of RTT measurements.

In some embodiments, the first message includes a dummy PDU. In such embodiments, the third method includes transmitting the second message and ignoring the dummy PDU. In some embodiments, the first message includes a DL PDU encapsulated by the first encapsulation packet header.

In some embodiments, the echo request indication includes a set of bits in the first encapsulation packet header. In certain embodiments, the echo request indication includes a first value for indicating that a packet payload associated with the first encapsulation packet header includes a PDU from the mobile core network, and wherein the echo request indication includes a second value for indicating that the packet payload includes a dummy PDU and for the UE to ignore the dummy PDU. In further embodiments, the echo response indication includes a set of bits in the second encapsulation packet header, and wherein the echo response indication includes a third value for indicating an acknowledgement of the echo request indication.

In some embodiments, the third method includes transmitting, to the interworking function and using a first QoS flow of the data connection, a third message including a third encapsulation packet header including a second echo request indication, wherein the third encapsulation packet header complies with the GRE protocol, B) receiving, from the interworking function, a fourth message including a fourth encapsulation packet header including a second echo response indication, wherein the fourth encapsulation packet header complies with the GRE protocol, and C) measuring a RTT for the first QoS flow of the data connection based on the second echo response indication.

In certain embodiments, the third message includes a dummy PDU, and the second echo request indication indicates that a packet payload including the dummy PDU and for the interworking function to ignore the dummy PDU. In certain embodiments, the third message includes an UL PDU encapsulated by the third encapsulation packet header, and the second echo request indication indicates that the UL PDU is to be forwarded to the mobile core network.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described above with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment ("UE") for wireless communication, comprising:

at least one memory; and at least one processor coupled with the at least one memory and configured to cause the UE to:

transmit a Protocol Data Unit ("PDU") session establishment request for establishing a PDU session with a mobile core network;

receive, from an interworking function, a first message that indicates a number of child IP security ("IPsec") security associations ("SAs") for the PDU session;

receive, from the interworking function, a second message that indicates an acceptance of the PDU session establishment request;

receive, from the interworking function, a third message associated with the PDU session, the third message comprising a first encapsulation packet header, wherein the first encapsulation packet header comprises an echo request indication and complies with a General Routing Encapsulation ("GRE") protocol; and transmit, to the interworking function, a second fourth message in response to the third message, the second fourth message comprising a second encapsulation packet header, wherein the second encapsulation packet header comprises an echo response indication and complies with the GRE protocol.

2. The UE of claim 1, wherein the PDU session establishment request comprises a first indicator that the UE supports a round trip time ("RTT") measurement procedure based on messages transmitted via the PDU session, wherein each of the messages transmitted via the PDU session comprises a respective encapsulation packet header, and wherein the at least one processor is configured to cause the UE to receive a first notification indicating an average RTT value derived based on a plurality of RTT measurements.

3. The UE of claim 1, wherein the third message comprises a dummy PDU, wherein the at least one processor is configured to cause the UE to transmit the fourth message and ignore the dummy PDU.

4. The UE of claim 1, wherein the third message comprises a DL PDU encapsulated by the first encapsulation packet header.

5. The UE of claim 1, wherein the echo request indication comprises a set of bits in the first encapsulation packet header.

6. The UE of claim 5, wherein the echo request indication comprises a first value for indicating that a packet payload associated with the first encapsulation packet header comprises a PDU from the mobile core network, and wherein the echo request indication comprises a second value for indicating that the packet payload comprises a dummy PDU and for the UE to ignore the dummy PDU.

7. The UE of claim 6, wherein the echo response indication comprises a set of bits in the second encapsulation packet header, and wherein the echo response indication comprises a third value for indicating an acknowledgement of the echo request indication.

8. The UE of claim 1, wherein the at least one processor is configured to cause the UE to:

transmit, to the interworking function and using a first quality of service ("QoS") flow of the PDU session, a fifth message comprising a third encapsulation packet header, wherein the third encapsulation packet header comprises a second echo request indication and complies with the GRE protocol;

receive, from the interworking function, a sixth message comprising a fourth encapsulation packet header, wherein the fourth encapsulation packet header comprises a second echo response indication and complies with the GRE protocol; and measure a round trip time ("RTT") for the first QoS flow of the PDU session based on the second echo response indication.

9. The UE of claim 8, wherein the fifth message comprises a dummy PDU, and wherein the second echo request indication indicates that a packet payload comprising the dummy PDU and for the interworking function to ignore the dummy PDU.

10. The UE of claim 8, wherein the fifth message comprises an uplink ("UL") PDU encapsulated by the third encapsulation packet header, and wherein the second echo request indication indicates that the UL PDU is to be forwarded to the mobile core network.

11. A processor for wireless communication, comprising:

at least one controller coupled with at least one memory and configured to cause the processor to:

transmit a Protocol Data Unit ("PDU") session establishment request for establishing a PDU session with a mobile core network;

receive, from an interworking function, a first message that indicates a number of child IP security ("IPsec") security associations ("SAs") for the PDU session;

receive, from the interworking function, a second message that indicates acceptance of the PDU session establishment request;

receive, from the interworking function, a third message associated with the PDU session, the third message comprising a first encapsulation packet header, wherein the first encapsulation packet header comprises an echo request indication and complies with a General Routing Encapsulation ("GRE") protocol; and transmit, to the interworking function, a fourth message in response to the third message, the fourth message comprising a second encapsulation packet header, wherein the second encapsulation packet header comprises an echo response indication and complies with the GRE protocol.

12. The processor of claim 11, wherein the PDU session establishment request comprises a first indicator that the processor supports a round trip time ("RTT") measurement procedure based on messages transmitted via the PDU session, wherein each of the messages transmitted via the PDU session comprises an encapsulation packet header, and wherein the at least one controller is configured to cause the processor to receive a first notification indicating an average RTT value derived based on a plurality of RTT measurements.

13. The processor of claim 11, wherein the third message comprises a dummy PDU, and wherein the at least one controller is configured to cause the processor to transmit the fourth message and ignore the dummy PDU.

14. The processor of claim 11, wherein the third message comprises a DL PDU encapsulated by the first encapsulation packet header.

15. The processor of claim 11, wherein the echo request indication comprises a set of bits in the first encapsulation packet header.

16. The processor of claim 15, wherein the echo request indication comprises a first value for indicating that a packet payload associated with the first encapsulation packet header comprises a PDU from the mobile core network, and wherein the echo request indication comprises a second value for indicating that the packet payload comprises a dummy PDU and for the processor to ignore the dummy PDU.

17. The processor of claim 16, wherein the echo response indication comprises a set of bits in the second encapsulation packet header, and wherein the echo response indication comprises a third value for indicating an acknowledgement of the echo request indication.

18. The processor of claim 11, wherein the at least one controller is configured to cause the processor to:
   transmit, to the interworking function and using a first quality of service ("QoS") flow of the PDU session, a fifth message comprising a third encapsulation packet header, wherein the third encapsulation packet header comprises a second echo request indication and complies with the GRE protocol;
   receive, from the interworking function, a sixth message comprising a fourth encapsulation packet header, wherein the fourth encapsulation packet header comprises a second echo response indication and complies with the GRE protocol; and
   measure a round trip time ("RTT") for the first QoS flow of the PDU session based on the second echo response indication.

19. The processor of claim 18, wherein the fifth message comprises a dummy PDU, and wherein the second echo request indication indicates that a packet payload comprising the dummy PDU and for the interworking function to ignore the dummy PDU.

20. The processor of claim 18, wherein the fifth message comprises an uplink ("UL") PDU encapsulated by the third encapsulation packet header, and wherein the second echo request indication indicates that the UL PDU is to be forwarded to the mobile core network.

* * * * *